(12) United States Patent
Zhou et al.

(10) Patent No.: US 12,075,750 B2
(45) Date of Patent: Sep. 3, 2024

(54) CAT LITTER BOX

(71) Applicant: JIANGSU ZHONGHENG PET ARTICLES JOINT-STOCK CO., LTD., Yancheng (CN)

(72) Inventors: Zhengjun Zhou, Hangzhou (CN); Liang Gu, Hangzhou (CN); Min Chen, Hangzhou (CN); Jianchun Chen, Hangzhou (CN); Tao Yang, Hangzhou (CN); Fen Xie, Hangzhou (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 0 days.

(21) Appl. No.: 18/687,819

(22) PCT Filed: Nov. 26, 2021

(86) PCT No.: PCT/CN2021/133472
§ 371 (c)(1),
(2) Date: Feb. 29, 2024

(87) PCT Pub. No.: WO2023/029241
PCT Pub. Date: Mar. 9, 2023

(65) Prior Publication Data
US 2024/0260535 A1    Aug. 8, 2024

(30) Foreign Application Priority Data
Aug. 30, 2021  (CN) .......................... 202111007344.1

(51) Int. Cl.
*A01K 1/01* (2006.01)

(52) U.S. Cl.
CPC .................................. *A01K 1/0114* (2013.01)

(58) Field of Classification Search
CPC ..... A01K 1/0114; A01K 1/011; A01K 1/0107; A01K 1/01
See application file for complete search history.

(56) References Cited

U.S. PATENT DOCUMENTS 11,963,512 B1 *  4/2024  Tang ..................... A01K 1/0114
2007/0227457 A1 * 10/2007  Waters ................ A01K 1/0114
                                                              119/166

(Continued)

FOREIGN PATENT DOCUMENTS

CN    109156367 A    1/2019
CN    210017386 U    2/2020

(Continued)

*Primary Examiner* — Trinh T Nguyen
(74) *Attorney, Agent, or Firm* — Bayramoglu Law Offices LLC

(57) ABSTRACT

A cat litter box includes a shell assembly, a rotary drum, and a driving assembly. The shell assembly includes a top shell, a middle shell, and a bottom shell arranged in sequence in a vertical direction. An excrement collection compartment is arranged inside the bottom shell. The excrement collection compartment is arranged opposite to the middle shell. The top shell is detachably connected to the middle shell. The middle shell is detachably connected to the bottom shell. A mounting cavity is formed between the top shell and the middle shell. The rotary drum is rotatably arranged in the mounting cavity. The driving assembly is detachably connected to the middle shell, and includes a driving unit. The driving unit is drivingly connected to the rotary drum.

13 Claims, 24 Drawing Sheets

(56) References Cited

U.S. PATENT DOCUMENTS

| | | | | |
|---|---|---|---|---|
| 2014/0245960 A1* | 9/2014 | Baxter | ................ | A01K 1/0114 |
| | | | | 119/166 |
| 2020/0060221 A1* | 2/2020 | Fan | ..................... | A01K 1/0114 |
| 2022/0125006 A1* | 4/2022 | Smith | .................. | A01K 1/0114 |
| 2023/0358946 A1* | 11/2023 | Freeman | ............. | G02B 6/0016 |
| 2024/0114874 A1* | 4/2024 | Zhang | ................ | A01K 1/0114 |

FOREIGN PATENT DOCUMENTS

| | | |
|---|---|---|
| CN | 210492080 U | 5/2020 |
| CN | 210869228 U | 6/2020 |
| CN | 211129321 U | 7/2020 |
| CN | 211153465 U | 8/2020 |
| CN | 211964995 U | 11/2020 |
| CN | 212877107 U | 4/2021 |
| CN | 112753590 A | 5/2021 |
| CN | 213214759 U | 5/2021 |
| CN | 213548943 U | 6/2021 |
| CN | 113229153 A | 8/2021 |
| CN | 216088192 U | 3/2022 |
| CN | 216088193 U | 3/2022 |
| CN | 216088194 U | 3/2022 |
| KR | 102004482 B1 | 7/2019 |
| TW | 201639448 A | 11/2016 |

\* cited by examiner

1

CAT LITTER BOX

CROSS-REFERENCE TO THE RELATED APPLICATIONS

This application is the national phase entry of International Application No. PCT/CN2021/133472, filed on Nov. 26, 2021, which is based upon and claims priority to Chinese Patent Application No. 202111007344.1, filed on Aug. 30, 2021, the entire contents of which are incorporated herein by reference.

TECHNICAL FIELD

The present disclosure belongs to the technical field of pet supplies, and in particular relates to a cat litter box.

BACKGROUND

With the acceleration of urbanization and the improvement of living standards, increasingly higher requirements are imposed on the environment for keeping household pets. As a popular household pet around the world, cats have their own uniqueness in character. Cats are clean and vigilant animals, and will bury their own excrement after excretion. Nowadays, keeping cats in families requires the preparation of a cat litter tray for training cats to excrete therein and the subsequent manual removal of the excrement.

However, existing cat litter trays available on the market have a complex structure and are cumbersome to assemble and disassemble, increasing the complexity of cleaning and maintenance of the cat litter trays.

SUMMARY

An objective of the present disclosure is to solve at least the problems of complex assembly and disassembly of the existing cat litter trays. The objective is achieved by the following technical solutions.

The present disclosure provides a cat litter box, including:
  a shell assembly, where the shell assembly includes a top shell, a middle shell, and a bottom shell arranged in sequence in a vertical direction, where an excrement collection compartment is arranged inside the bottom shell, the excrement collection compartment is arranged opposite to the middle shell, the top shell is detachably connected to the middle shell, the middle shell is detachably connected to the bottom shell, and a mounting cavity is formed between the top shell and the middle shell;
  a rotary drum, which is rotatably arranged in the mounting cavity; and
  a driving assembly, which is detachably connected to the middle shell and includes a driving unit, where the driving unit is drivingly connected to the rotary drum.

In the cat litter box according to the present disclosure, the shell assembly is divided into the top shell, the middle shell, and the bottom shell arranged in sequence in the vertical direction. The top shell is detachably connected to the middle shell. The middle shell is detachably connected to the bottom shell. The rotary drum is arranged in the mounting cavity formed by the top shell and the middle shell. The driving assembly is arranged on the middle shell to drive the rotary drum to rotate. In this way, the respective component structures of the cat litter box can be effectively modularized to facilitate the assembly and disassembly of the cat litter box, thereby facilitating the cleaning and maintenance of the cat litter box and improving the production and assembly efficiency of the cat litter box.

In addition, the cat litter box according to the present disclosure may further have the following additional technical features.

In some embodiments of the present disclosure, a first opening is provided at a bottom of the middle shell, a second opening opposite to the first opening is provided at a top of the bottom shell, the excrement collection compartment is removably inserted into a side surface of the bottom shell, and a third opening opposite to the second opening is provided at a top of the excrement collection compartment.

In some embodiments of the present disclosure, the cat litter box further includes a deodorizing assembly, where the deodorizing assembly is detachably connected to the bottom shell and is in communication with an internal cavity of the bottom shell.

In some embodiments of the present disclosure, the deodorizing assembly includes a spray generator and a deodorizing liquid box, and the deodorizing liquid box is detachably connected to the spray generator.

In some embodiments of the present disclosure, the bottom shell includes a shell portion and a cover plate portion, the second opening is provided at a top of the shell portion, a fourth opening is provided at a bottom of the shell portion, and the cover plate portion is configured to cover the fourth opening and is detachably connected to the shell portion.

In some embodiments of the present disclosure, a rotary drum shaft coaxial with the rotary drum is arranged at a rear end of the rotary drum, and an end of the rotary drum shaft is rotatably connected to the driving assembly.

In some embodiments of the present disclosure, the driving assembly further includes:
  an integral bracket, where a first accommodating groove and a second accommodating groove each having an opening facing an outside of the cat litter box are provided on the integral bracket, the first accommodating groove is inserted into an interior of the top shell, and the second accommodating groove is inserted into an interior of the middle shell; and
  an electric control board, which is arranged in the first accommodating groove, where the driving unit is arranged inside the second accommodating groove and electrically connected to the electric control board.

In some embodiments of the present disclosure, the driving assembly further includes a first gear, where the first gear is drivingly connected to an output shaft of the driving unit, a second gear coaxial with the rotary drum shaft is arranged at the rear end of the rotary drum, and the first gear is meshed with the second gear.

In some embodiments of the present disclosure, the cat litter box further includes at least two support assemblies, where the at least two support assemblies are arranged between the middle shell and the rotary drum, and are configured to jointly support a rotation of the rotary drum, and the at least two support assemblies each include a support base and a roller rotatably connected to the support base, where the support base is connected to an inner wall surface of the middle shell, and the roller is rotatably pressed against an outer wall surface of the rotary drum.

In some embodiments of the present disclosure, an annular support is arranged on an outer peripheral surface of a front end of the rotary drum, and the roller is pressed against the annular support.

In some embodiments of the present disclosure, a sieve plate is further arranged inside the rotary drum, and the sieve plate is detachably connected to an inner wall of the rotary drum.

In some embodiments of the present disclosure, the sieve plate includes a plate body, the plate body includes at least one arc-shaped surface, a plurality of first sieve holes and a plurality of second sieve holes are provided on the at least one arc-shaped surface, and a length direction of each of the plurality of first sieve holes and a length direction of each of the plurality of second sieve holes are configured to form an angle.

In some embodiments of the present disclosure, the cat litter box further includes a door panel assembly, where the door panel assembly is detachably connected to a front end of the shell assembly.

BRIEF DESCRIPTION OF THE DRAWINGS

Various other advantages and benefits will become apparent to those of ordinary skill in the art by reading the following detailed description of preferred embodiments. The accompanying drawings are merely used for illustrating the preferred embodiments and are not intended to limit the present disclosure. Throughout the accompanying drawings, the same reference numerals are used to represent the same components. In the drawings.

LIST OF REFERENCE NUMERALS

Figure 1:
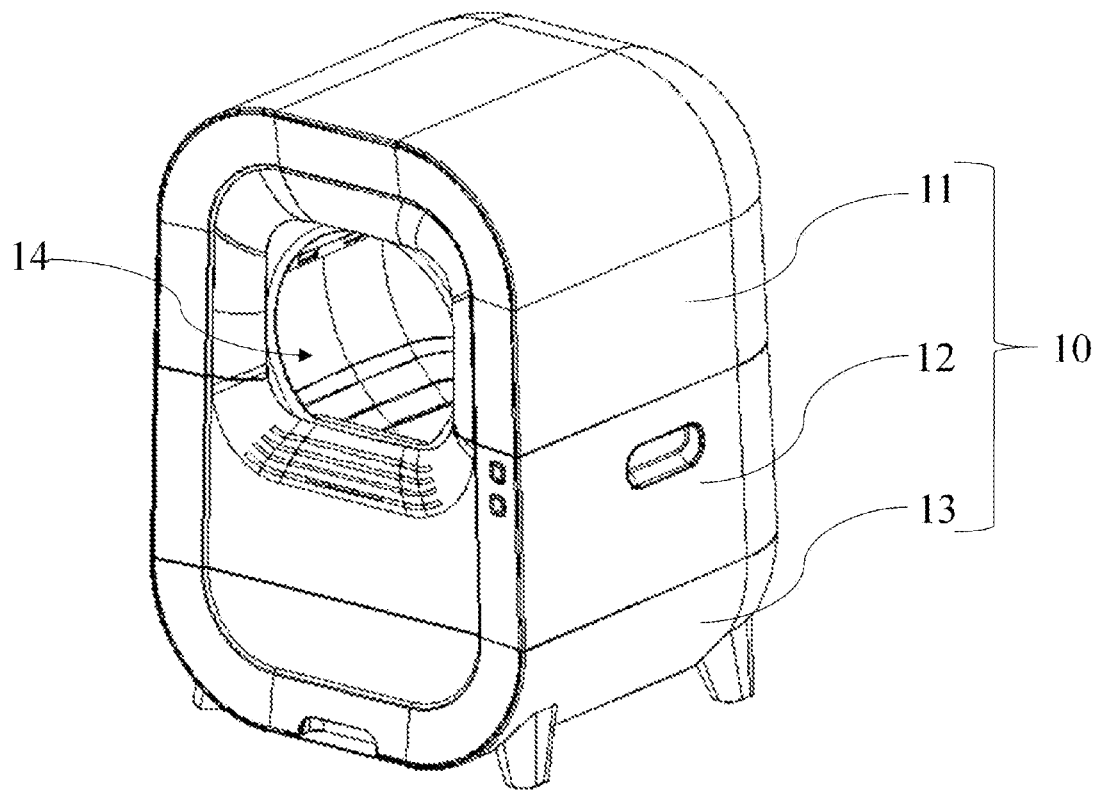
FIG. 1 is an overall schematic structural view of a cat litter box according to an embodiment of the present disclosure.

1: cat litter box;
10: shell assembly; 11: top shell; 12: middle shell; 121: handgrip structure; 122: positioning insertion opening; 13: bottom shell; 131: shell portion; 1311: second opening; 132: cover plate portion; 133: support leg; 134: support leg decoration member; 135: weighing sensor; 136: sensor support; 14: access opening;
20: rotary drum; 21: first drum portion; 211: first connection portion; 212: rotary drum entrance; 213: annular support; 22: second drum portion; 221: second connection portion; 222: first through hole; 23: waste discharge port; 231: first notch; 232: second notch; 24: anti-adhesion layer bracket; 25: anti-adhesion layer; 26: rotary drum shaft; 261: second through hole; 27: second gear; 28: bearing; 29: mounting groove;
30: driving assembly; 31: integral bracket; 311: support plate; 3111: driving hole; 312: first accommodating groove; 313: second accommodating groove; 314: enclosing plate; 315: transverse partition plate; 316: protection plate; 317: reinforcing plate; 318: mounting stage; 319: bearing housing; 3191: through hole; 32: cover plate; 33: electric control board; 34: driving unit; 341: driving motor; 342: reduction gearbox; 35: light transmitting lens; 36: first gear;
40: excrement collection compartment; 41: third opening;
50: deodorizing assembly; 51: spray generator; 511: first box body; 512: bottom plate; 513: elastic protrusion; 514: first connection end; 515: insertion portion; 516: delivery pipe; 517: connection joint; 52: deodorizing liquid box; 521: second box body; 522: second connection end;
60: support assembly; 61: support base; 62: roller;
70: sieve plate; 71: plate body; 711: first sieve hole; 712: second sieve hole; 72: connection end; 721: connection plate; 722: L-shaped member; 7221: arc-shaped protrusion;
81: box body; 811: L-shaped protrusion; 812: engaging groove; 813: connection terminal; 814: first slot; 815: second slot; 82: box cover; 821: first insertion portion; 822: second insertion portion;
90: door panel assembly; 91: door panel body; 92: fixing groove; 93: handle; 94: strip-shaped protrusion; 95: rubber strip;
S1: first arc-shaped surface; S2: second arc-shaped surface; S3: third arc-shaped surface.

DETAILED DESCRIPTION OF THE EMBODIMENTS

Exemplary embodiments of the present disclosure will be described in detail with reference to the accompanying drawings. Although the accompanying drawings show the exemplary embodiments of the present disclosure, it should be understood that the present disclosure may be implemented in various forms and is not limited to the embodiments described herein. Rather, these embodiments are provided for enabling a more thorough understanding of the present disclosure and fully conveying the scope of the present disclosure to those skilled in the art.

It should be understood that the terms used herein are for the purpose of describing particular example embodiments only and are not intended to be limiting. As used herein, the singular forms "a", "an" and "the" may also be meant to include the plural forms unless the context clearly indicates otherwise. The terms such as "include", "include", "have" and their variants are inclusive and therefore indicate the existence of stated features, steps, operations, elements, and/or components, but do not exclude the existence or addition of one or more other features, steps, operations, elements, components, and/or combinations thereof. The method steps, procedures, and operations described herein are not to be construed as having to be performed in the particular order described or illustrated, unless the order of execution is clearly stated. It should also be understood that additional or alternative steps can be used.

For ease of description, spatially relative terms such as "inside", "outside", "inner", "outer", "below", "underneath", "over", "above", etc. may be used herein to describe a relationship between one element or feature and another element or feature as shown in the figures. Such spatially relative terms are intended to encompass other orientations of the apparatus in use or operation in addition to the orientations depicted in the figures. For example, if the apparatus in the figures is turned over, an orientation of an element described as "below another element or feature" or "beneath another element or feature" is changed to "over another element or feature" or "above another element or feature". Therefore, the exemplary term "below" may include two orientations: above and below. The apparatus may be otherwise oriented (rotated 90 degrees or at other orientations) and the spatially relative descriptors used herein interpreted accordingly.

Figure 2:
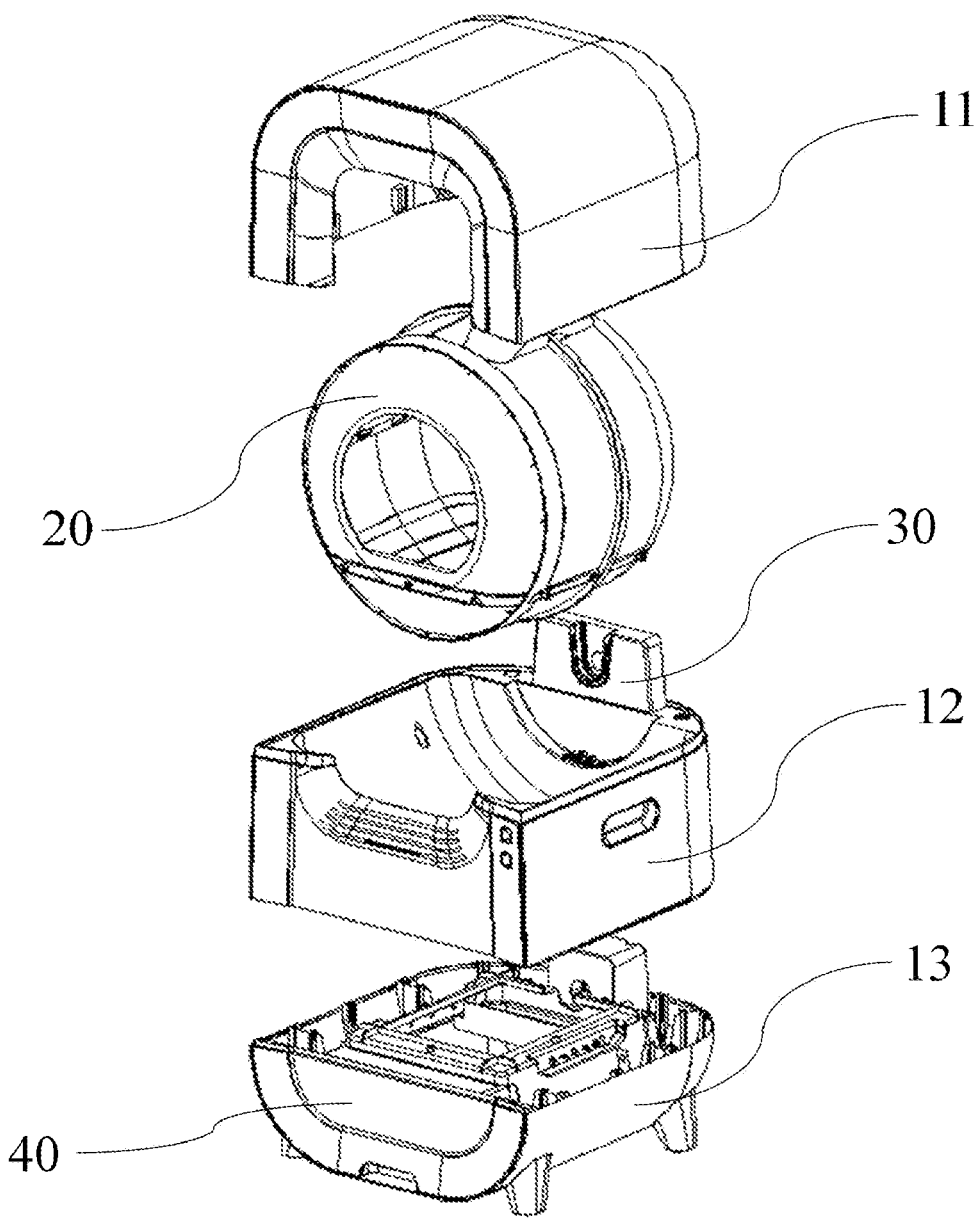
FIG. 2 is a schematic exploded structural view of the cat litter box in FIG. 1.
Figure 3:
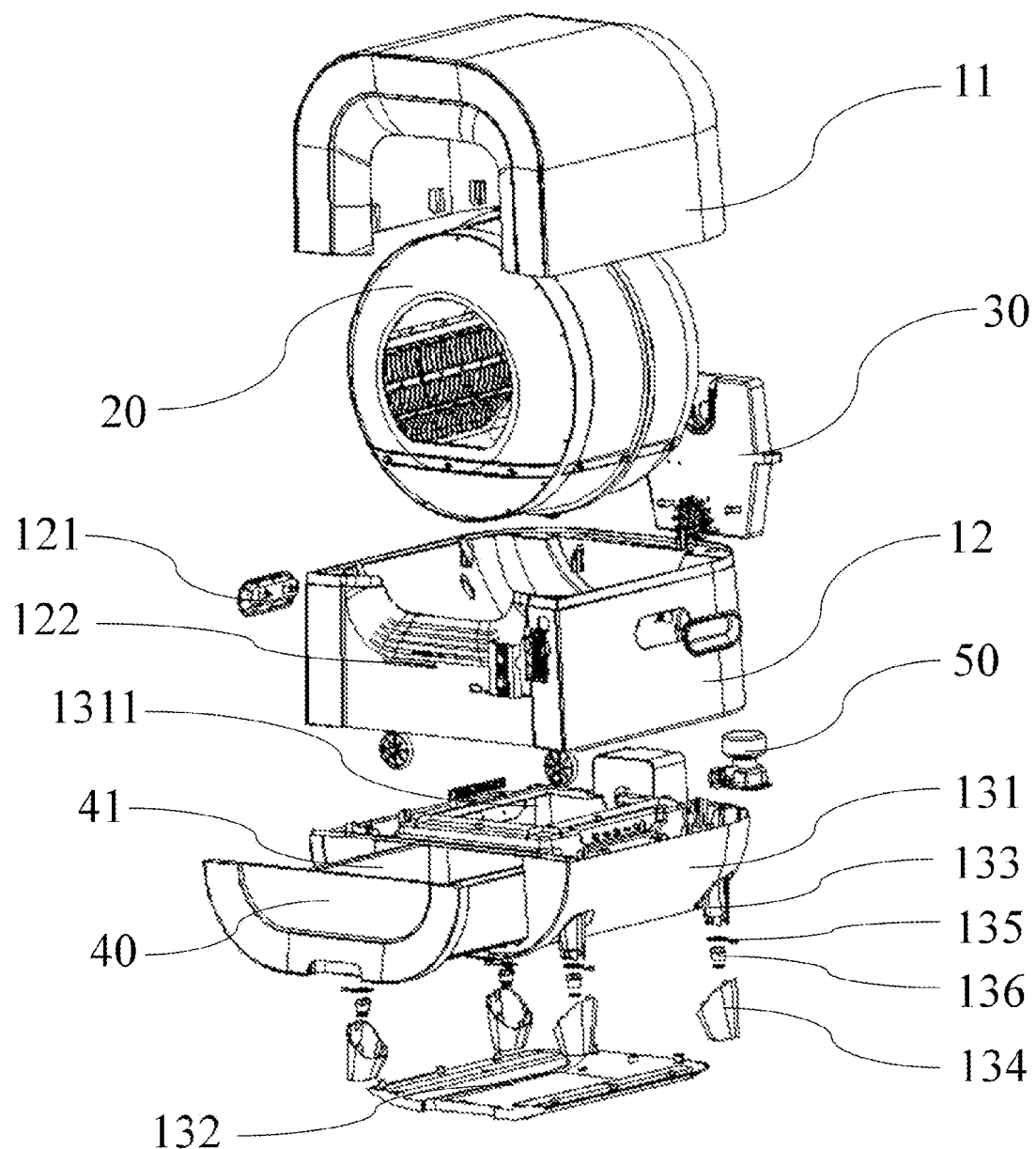
FIG. 3 is a further schematic exploded structural view of the cat litter box in FIG. 2.

As shown in FIG. 1 to FIG. 3, a cat litter box according to an embodiment of the present disclosure includes a shell assembly 10, a rotary drum 20, and a driving assembly 30. The shell assembly 10 includes a top shell 11, a middle shell 12, and a bottom shell 13 arranged in sequence in a vertical direction. The top shell 11 is detachably connected to the middle shell 12, the middle shell 12 is detachably connected to the bottom shell 13, and a mounting cavity is formed between the top shell 11 and the middle shell 12. The rotary drum 20 is rotatably arranged in the mounting cavity. The driving assembly 30 is detachably connected to a rear end of the middle shell 12. The driving assembly 30 includes a driving unit 34. The driving unit 34 is drivingly connected to the rotary drum 20 and configured to drive the rotary drum 20 to rotate.

In the cat litter box 1 according to the present disclosure, the shell assembly 10 is divided into the top shell 11, the middle shell 12, and the bottom shell 13 arranged in sequence in the vertical direction. The top shell 11 is detachably connected to the middle shell 12. The middle shell 12 is detachably connected to the bottom shell 13. The rotary drum 20 is arranged in the mounting cavity formed by the top shell 11 and the middle shell 12. The driving assembly 30 is arranged on the middle shell 12 to drive the rotary drum 20 to rotate. In this way, the respective component structures of the cat litter box 1 can be effectively modularized to facilitate the assembly and disassembly of the cat litter box 1, thereby facilitating the cleaning and maintenance of the cat litter box 1 and improving the production and assembly efficiency of the cat litter box 1.

Further, in this embodiment, a handgrip structure 121 is further arranged on each of two side surfaces of the middle shell 12. A part of the handgrip structure 121 is inserted into the middle shell 12 for fixing the handgrip structure 121, and another part of the handgrip structure 121 is arranged outside the middle shell 12 for holding by a user during carrying the cat litter box 1.

Further, the cat litter box 1 according to this embodiment further includes an excrement collection compartment 40. A first opening (not shown) is provided at a bottom of the middle shell 12. A second opening 1311 opposite to the first opening is provided at a top of the bottom shell 13. The excrement collection compartment 40 is removably inserted into a front side surface of the bottom shell 13. A third opening 41 opposite to the second opening 1311 is provided at a top of the excrement collection compartment 40. The excrement collection compartment 40 is configured to collect excrement discharged from the rotary drum 20 and is removably connected to the bottom shell 13, so that when the excrement is discharged, the excrement collection compartment 40 can be easily cleaned by removing the excrement collection compartment 40 from the bottom shell 13.

Further, in this embodiment, the bottom shell 13 includes a shell portion 131 and a cover plate portion 132. The second opening 1311 is provided at a top of the shell portion 131. A fourth opening (not shown) is provided at a bottom of the shell portion 131. The cover plate portion 132 is configured to cover the fourth opening and is detachably connected to the shell portion 131. The cover plate portion 132 can be removed to facilitate the disassembly and assembly of parts at the bottom of the shell portion 131, thereby further improving the production and assembly efficiency of the cat litter box 1.

Further, as shown in FIG. 3, in this embodiment, a plurality of support legs 133 are further arranged on a bottom surface of the shell portion 131. Specifically, four support legs 133 are provided. The four support legs 133 are arranged in a rectangular pattern to support the cat litter box 1. Support leg decoration members 134 are respectively sleeved over the support legs 133 to improve the aesthetics of the overall appearance of the cat litter box 1. Further, a weighing sensor 135 and a sensor support 136 are further arranged in sequence between a bottom of each of the support legs 133 and a respective one of the support leg decoration members 134. The weighing sensor 135 is configured to detect an overall weight of the cat litter box 1 to determine whether a pet enters the cat litter box 1 or whether replenishing of cat litter is required. The sensor support 136 is arranged below the weighing sensor 135 to support the weighing sensor 135. Specifically, the top shell 11 is a concave structure having an opening facing the middle shell 12, and the middle shell 12 is a concave structure having an opening facing the top shell 11. The mounting cavity is formed between the two concave structures. A front end surface of the top shell 11 and a front end surface of the middle shell 12 form an access opening 14 which is in communication with the mounting cavity. A pet can enter the mounting cavity through the access opening 14 and then enter the rotary drum 20 for excretion.

As shown in FIG. 4 to FIG. 7, the driving assembly 30 in this embodiment includes an integral bracket 31, an electric control board 33, and the driving unit 34. The integral bracket 31 includes a support plate 311, a first accommodating groove 312, and a second accommodating groove 313. The first accommodating groove 312 is provided on an outer wall of the support plate 311 facing away from the rotary drum 20 and is configured for mounting the electric control board 33. The second accommodating groove 313 is also provided on the outer wall of the support plate 311 and is spaced apart from the first accommodating groove 312 and configured for mounting the driving unit 34. In this embodiment, an insertion opening is provided at a top of the rear end of the middle shell 12, an insertion opening is provided at a bottom of the rear end of the top shell 11, a part of the support plate 311 provided with the second accommodating groove 313 is inserted into the insertion opening at the rear end of the middle shell 12, and a part of the support plate 311 provided with the first accommodating groove 312 is inserted into the insertion opening at the rear end of the top shell 11. As such, the driving assembly 30 is inserted into the shell assembly 10. In this embodiment, because the electric control board 33 of the driving assembly 30 is arranged above the middle shell 12, the electric control board 33 can be repaired or replaced by removing the top shell 11 to expose the electric control board 33, thereby facilitating the operation on the electric control board 33. Further, in this embodiment, the driving assembly 30 further includes a cover plate 34. The cover plate 34 is detachably connected to a part of the integral bracket 31 which is located above the middle shell 12, and covers the electric control board 33. The cover plate 34 further protects the electric control board 33 to prevent the electric control board 33 from getting wet or being damaged.

In some other embodiments of the present disclosure, a notch matching with a top of the integral bracket 31 may be provided at the rear end of the top shell 11, and a part of the integral bracket 31 which is located above the middle shell may be placed in the notch; or the integral bracket 31 is directly arranged outside the top shell 11, and a cover plate 34 is arranged at the first accommodating groove 312. The cover plate 34 is detachably connected to the part of the integral bracket 31 which is located above the middle shell 12, and covers the electric control board 33. The cover plate 34 protects the electric control board 33 to prevent the electric control board 33 from getting wet or being damaged.

In this embodiment, the integral bracket 31 can integrate the electric control board 33 and the driving unit 34 together, to simplify the layout of the core parts of the cat litter box 1 and achieve the modular design of the core parts, thereby improving the disassembly and assembly efficiency of the cat litter box 1 and reducing the maintenance cost of the cat litter box 1. It can be understood that the specific structure of the integral bracket 31 and the specific distribution of the first accommodating groove 312 and the second accommodating groove 313 are not limited in the above embodiments, because the integral bracket 31 may be configured as a rectangular, circular, elliptical, or runway circular structure, and the first accommodating groove 312 and the second accommodating groove 313 may be distributed vertically or transversely.

Figure 4:
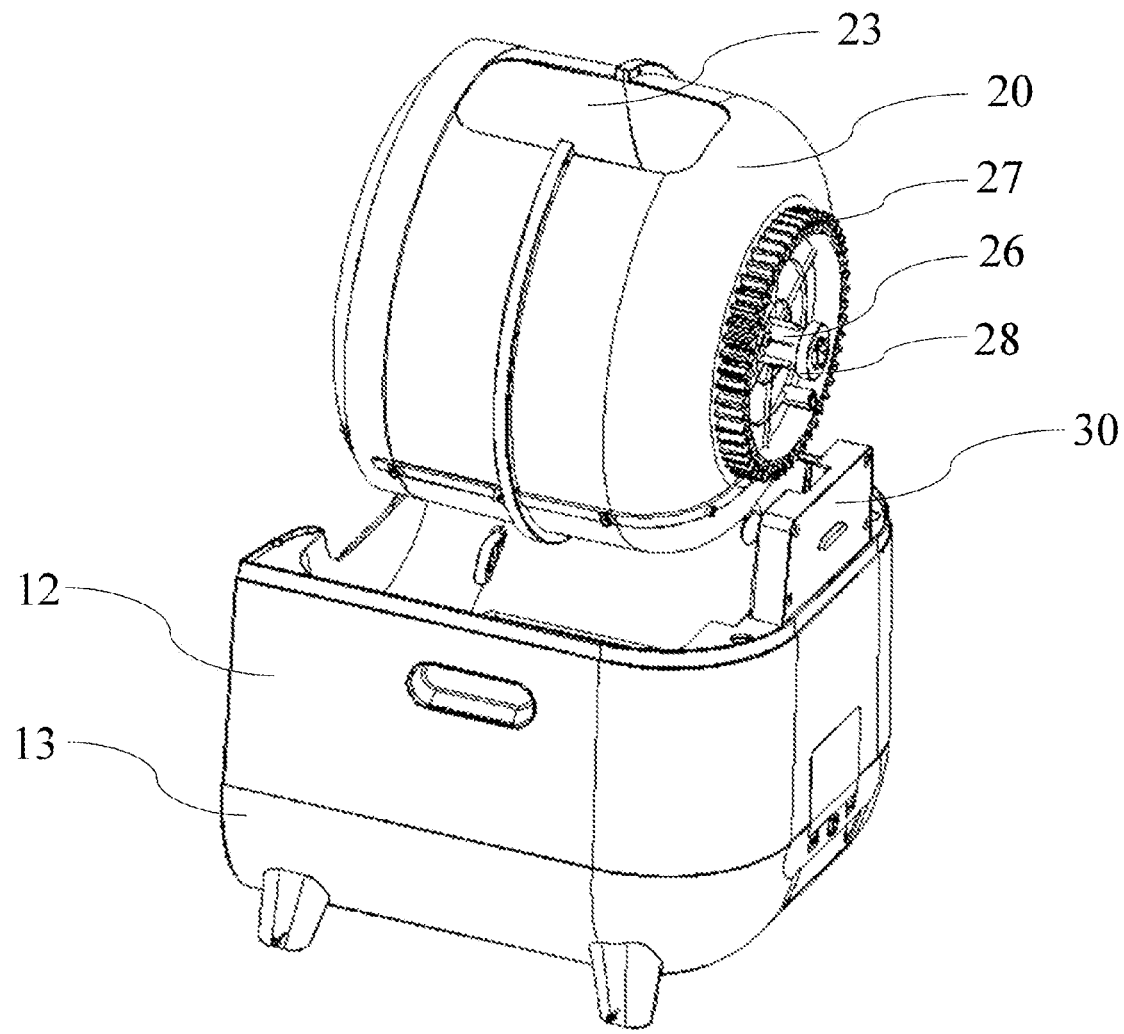
FIG. 4 is a schematic structural view showing relative positions of a rotary drum and a middle shell in FIG. 2.
Figure 5:
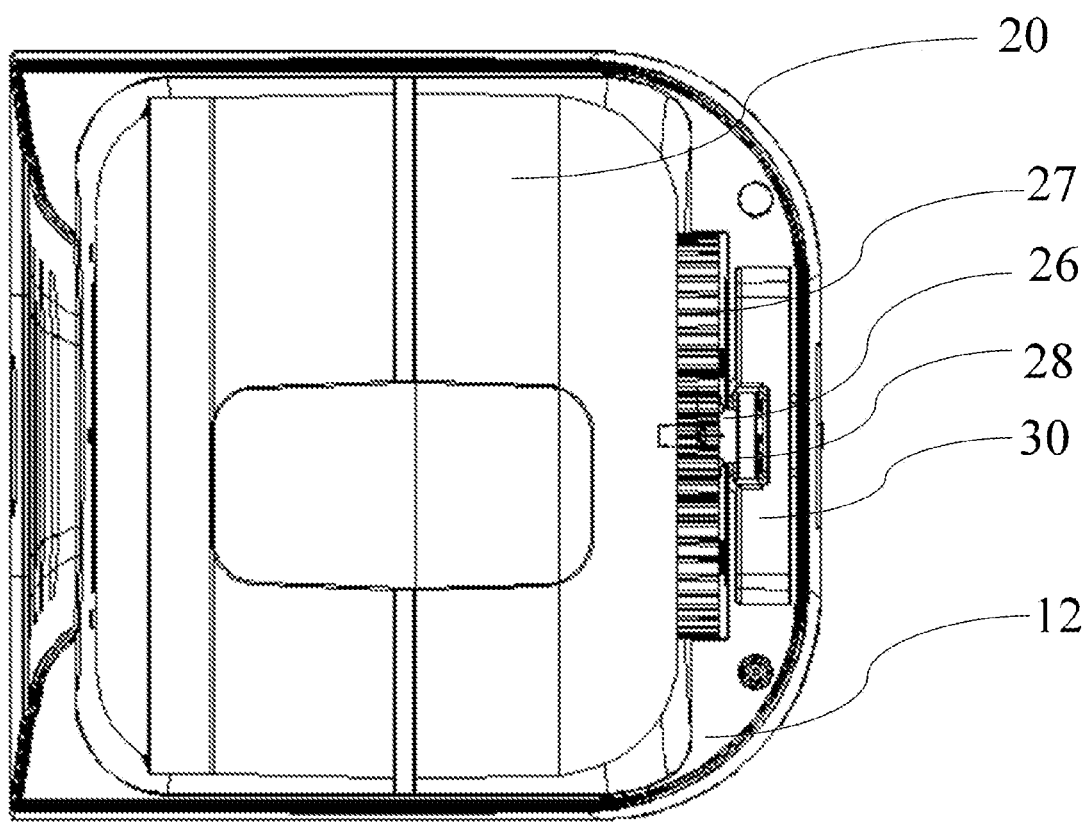
FIG. 5 is a schematic assembled structural view of the rotary drum and the middle shell in FIG. 4.

Further, in this embodiment, an inner wall of the support plate 311 is recessed toward the first accommodating groove 312 to form a bearing housing 319, and the bearing housing 319 is configured to engage with a rotary drum shaft 26 of the cat litter box 1. As shown in FIG. 4 and FIG. 5, in this embodiment, the rotary drum shaft 26 is arranged at a rear end of the rotary drum 20, the rotary drum shaft 26 is coaxial with the rotary drum 20, a bearing 28 is sleeved over an end of the rotary drum shaft 26 distant from the rotary drum 20, and the bearing 28 is arranged in the bearing housing 319 to support a rotation of the rotary drum 20. In this embodiment, the bearing housing 319, the first accommodating groove 312, and the second accommodating groove 313 are integrated on the integral bracket 31, the electric control board 33 is fixed to the first accommodating groove 312 of the integral bracket 31, the driving unit 34 is fixed to the second accommodating groove 313 of the integral bracket 31, and the rotary drum shaft 20 is supported by the bearing housing 319 of the integral bracket 31. As such, the number of support structures is reduced, thereby facilitating disassembly, assembly, and maintenance of the integral bracket 31.

Figure 7:
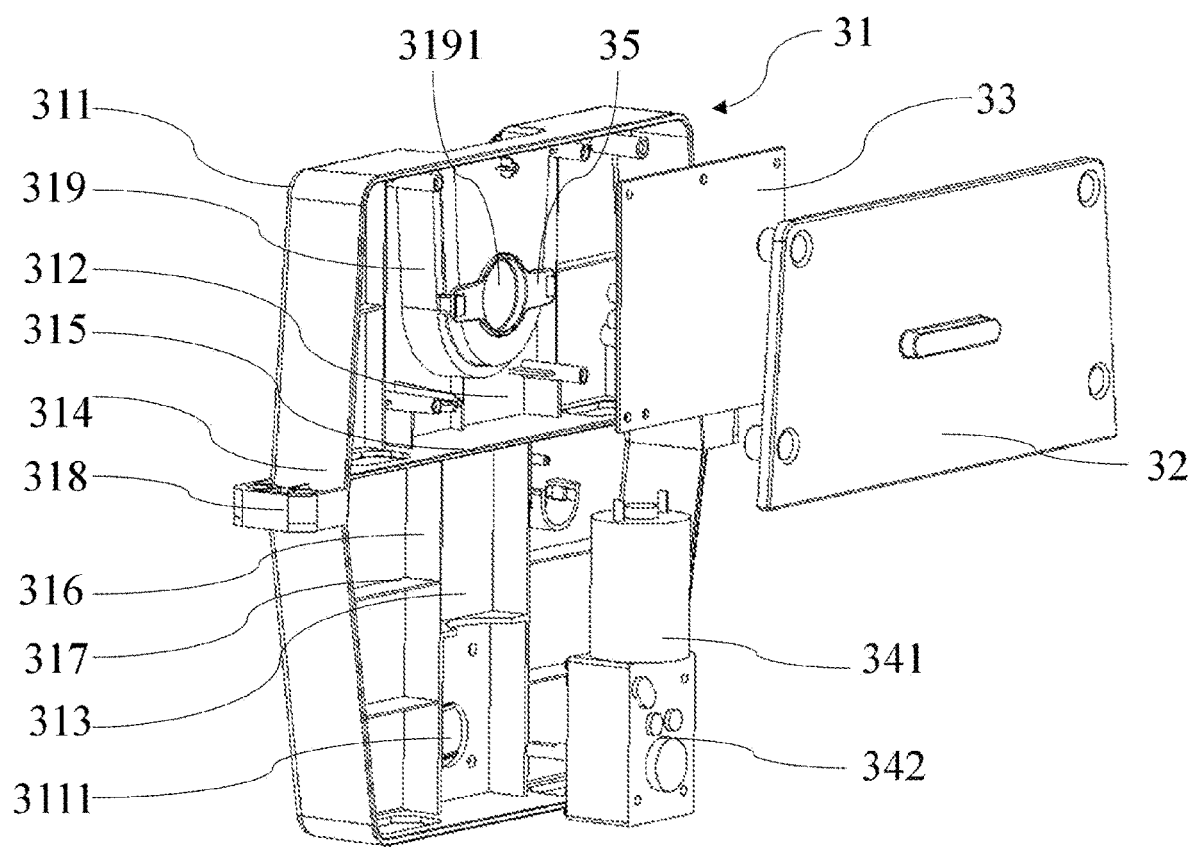
FIG. 7 is a schematic structural view of the driving assembly in FIG. 6.
Figure 8:
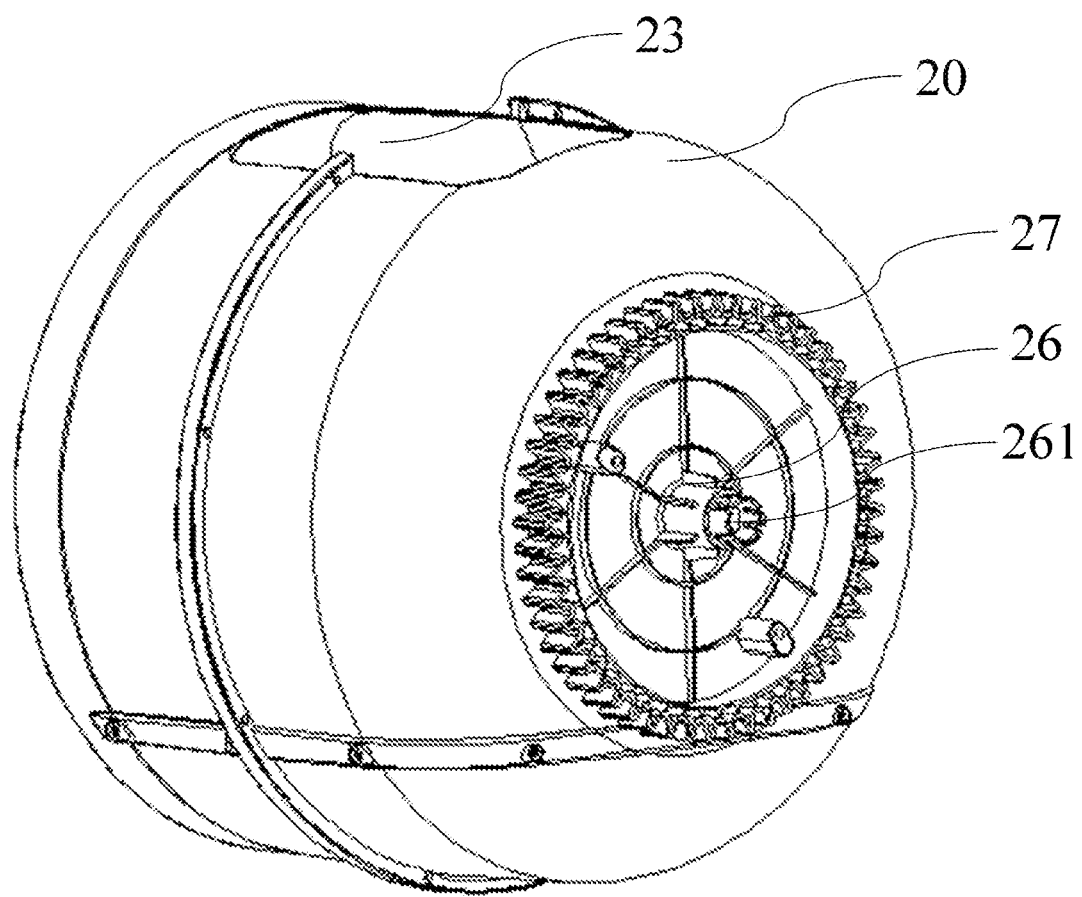
FIG. 8 is a schematic structural view of the rotary drum in FIG. 2.

Further, in this embodiment, the rotary drum shaft 26 is configured as a hollow structure in communication with the rotary drum 20, and a through hole 3191 in communication with the rotary drum shaft 26 and the rotary drum 20 is provided on the bearing housing 319. As shown in FIG. 7 and FIG. 8, in this embodiment, the rotary drum shaft 26 is configured as a hollow structure in communication with the rotary drum 20 of the cat litter box 1, a second through hole 261 is provided inside the rotary drum shaft 26 in an axial direction, and the through hole 3191 in communication with the rotary drum shaft 26 and the rotary drum 20 is provided on the bearing housing 319. Therefore, a detection sensor for detecting a status in the rotary drum 20 can be arranged at a position corresponding to the through hole 3191 on the electric control board 33. For example, a pyroelectric infrared sensor may be mounted on the electric control board 33. The pyroelectric infrared sensor is configured to detect whether there is a pet in the rotary drum 20, so that an operational status of the rotary drum 20 of the cat litter box 1 can be controlled based on whether there is a pet in the rotary drum 20. Further, to prevent cat litter or dust in the rotary drum 20 from entering the first accommodating groove 312 through the through hole 3191 to damage the electric control board 33 or affect the normal operation of the pyroelectric infrared sensor, a light transmitting lens 35 is further arranged at the through hole 3191. A part of the light transmitting lens 35 is inserted and fixed inside the through hole 3191, so that the situation in the rotary drum 20 can be detected through the through hole 3191 and cat litter or dust can be effectively prevented from entering the first accommodating groove 312.

Further, in this embodiment, protection plates 316 located on two sides of the driving unit 34 and a plurality of reinforcing plates 317 located on two sides of the protection plates 316 and configured to support the protection plates 316 are arranged in the second accommodating groove 313. A mounting groove for fixing the driving unit 34 is formed between the two protection plates 316. The driving unit 34 is positioned by the two protection plates 316 on the two sides of the driving unit 34, thereby improving the mounting stability of the driving unit 34 and reducing loosening of the driving unit 34 in the second accommodating groove 343. Further, in this embodiment, an enclosing plate 31 is arranged on a periphery of the outer wall of the support plate 311, a transverse partition plate 315 is arranged in a middle of the support plate 311, and the enclosing plate 31 and the transverse partition plate 315 jointly define the first accommodating groove 312 and the second accommodating groove 313. When the integral bracket 31 in this embodiment is inserted into the shell assembly 10, a bottom of the enclosing plate 314 is tightly attached to an inner wall of the shell assembly 10, to protect the electric control board 33 and the driving unit 34, reduce the entry of water vapor and dust from the outside into the first accommodating groove 312 and/or the second accommodating groove 313, and reduce the corrosion of the electric control board 33 and the driving unit 34 by water vapor and/or dust.

In this embodiment, the electric control board 33 is configured to control an operational status of the driving unit 34, for example, control on/off and an operating power of the driving unit 34. The isolation of the electric control board 33 from the driving unit 34 can reduce the interference between the electric control board 33 and the driving unit 34. For example, if the electric control board 33 has a weak electric signal, the driving unit 34 requires a strong electric signal, and the isolation of the electric control board 33 from the driving unit 34 can reduce the interference of the strong electric signal of the driving unit 34 to the weak electric signal of the electric control board 33. Further, in this embodiment, the integral bracket 31 further includes a mounting stage 318 arranged on two sides of an outer wall of the enclosing plate 31, and a fastening hole for fastening the integral bracket 31 is provided on each of the support plate 31 and the mounting stage 318. Specifically, fastening holes distributed in the vertical direction are provided on the mounting stage 318, fastening holes distributed in a horizontal direction are provided on the support plate 311, and the integral bracket 31 is mounted to the shell assembly 10 of the cat litter box 1 through the fastening holes distributed in the vertical direction and the fastening holes distributed in the horizontal direction, thereby achieving vertical and transverse fastening of the integral bracket 31 to reduce loosening of the integral bracket 31 during use.

Figure 6:
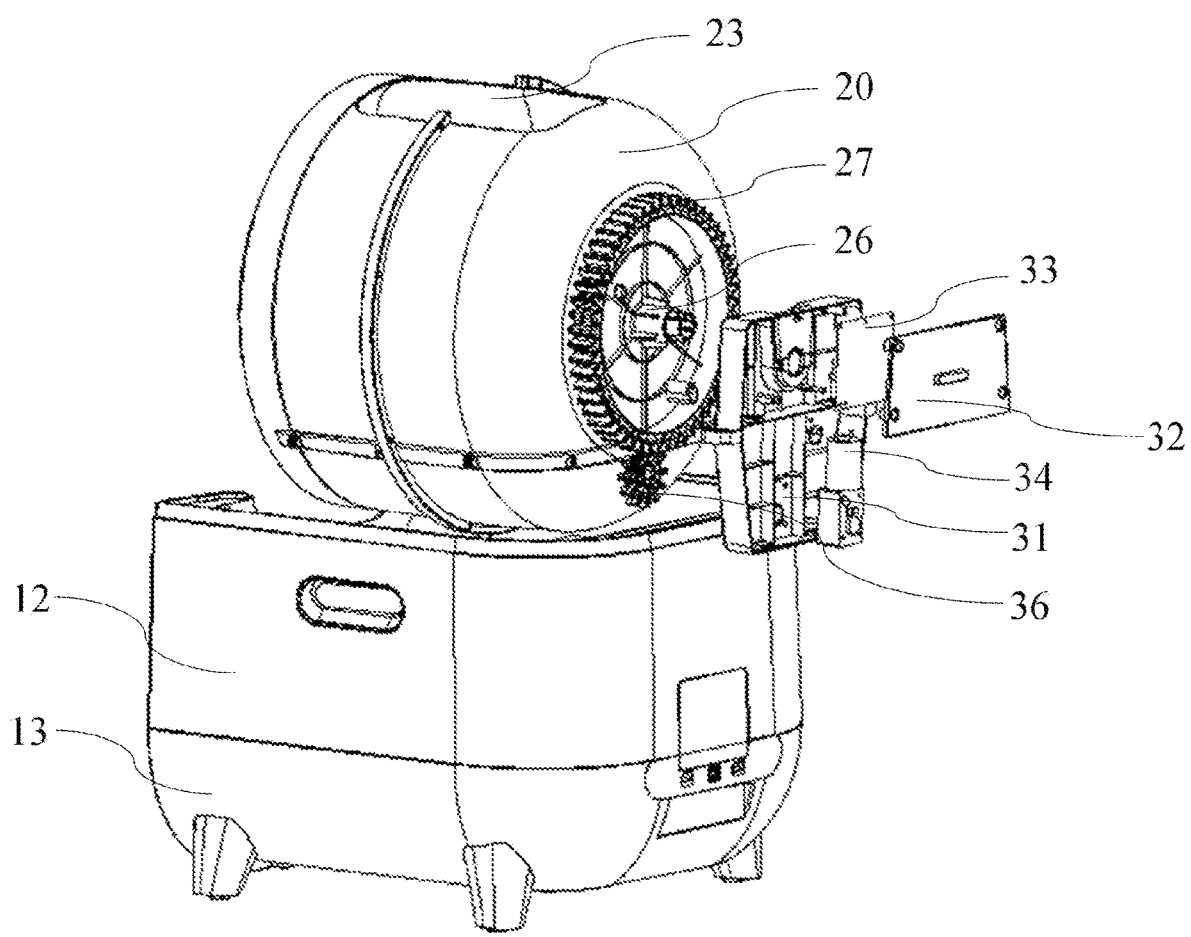
FIG. 6 is a schematic structural view showing relative positions of the rotary drum and a driving assembly in FIG. 4.

Specifically, in this embodiment, the driving unit 34 includes a driving motor 341 and a reduction gearbox 342. Two protection plates 316 located at two sides of the driving unit 34 are arranged in the second accommodating groove 312. The mounting groove for fixing the driving unit 34 is defined between the two protection plates 316. A transverse plate transversely distributed to separate the driving motor 341 from the reduction gearbox 342 is further provided in the mounting groove. The driving motor 341 and the reduction gearbox 342 are separated from each other by the transverse plate and are separately fixed, thereby improving the structural stability of the driving motor 341 and the reduction gearbox 342. Further, in this embodiment, a driving hole 3111 opposite to an output shaft of the reduction gearbox 342 is further provided at a bottom of the support plate 311, and the output shaft of the reduction gearbox 342 extends to the outside of the integral bracket 31 through the driving hole 3111 to drive the rotary drum 20 to rotate. Specifically, as shown in FIG. 5 and FIG. 6, in this embodiment, a first gear 36 is sleeved over the output shaft of the reduction gearbox 342, the first gear 36 is arranged outside the second accommodating groove 312, a second gear 27 matching with the first gear 36 is arranged at the rear end of the rotary drum 20, and the first gear 36 is meshed with the second gear 27 to drive the rotary drum 20 to rotate through the driving unit 34.

Figure 9:
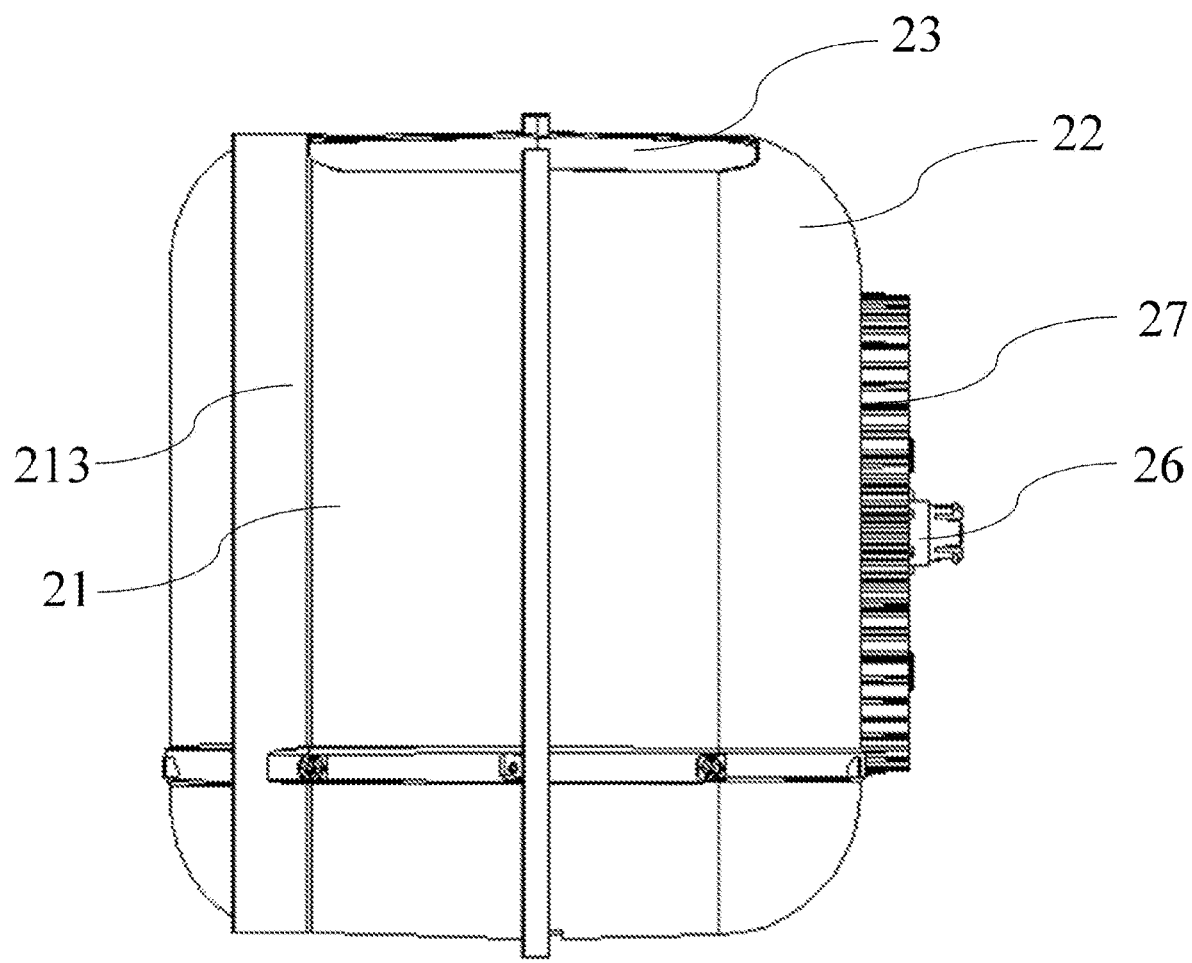
FIG. 9 is a schematic structural view of the rotary drum in FIG. 8 viewed from another angle.
Figure 10:
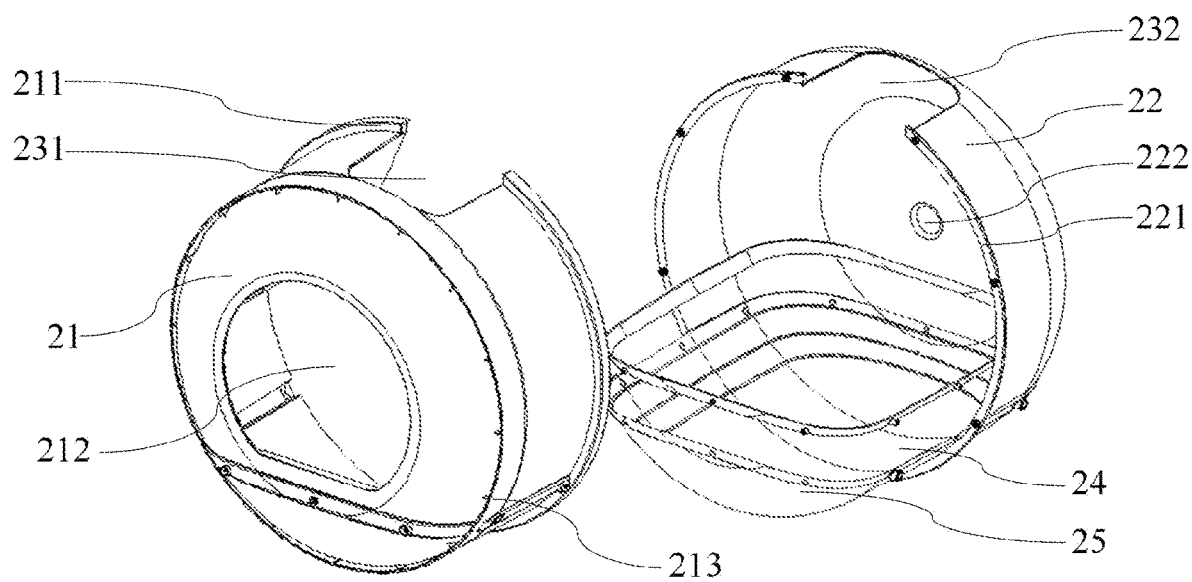
FIG. 10 is a schematic exploded structural view of the rotary drum in FIG. 8.
Figure 11:
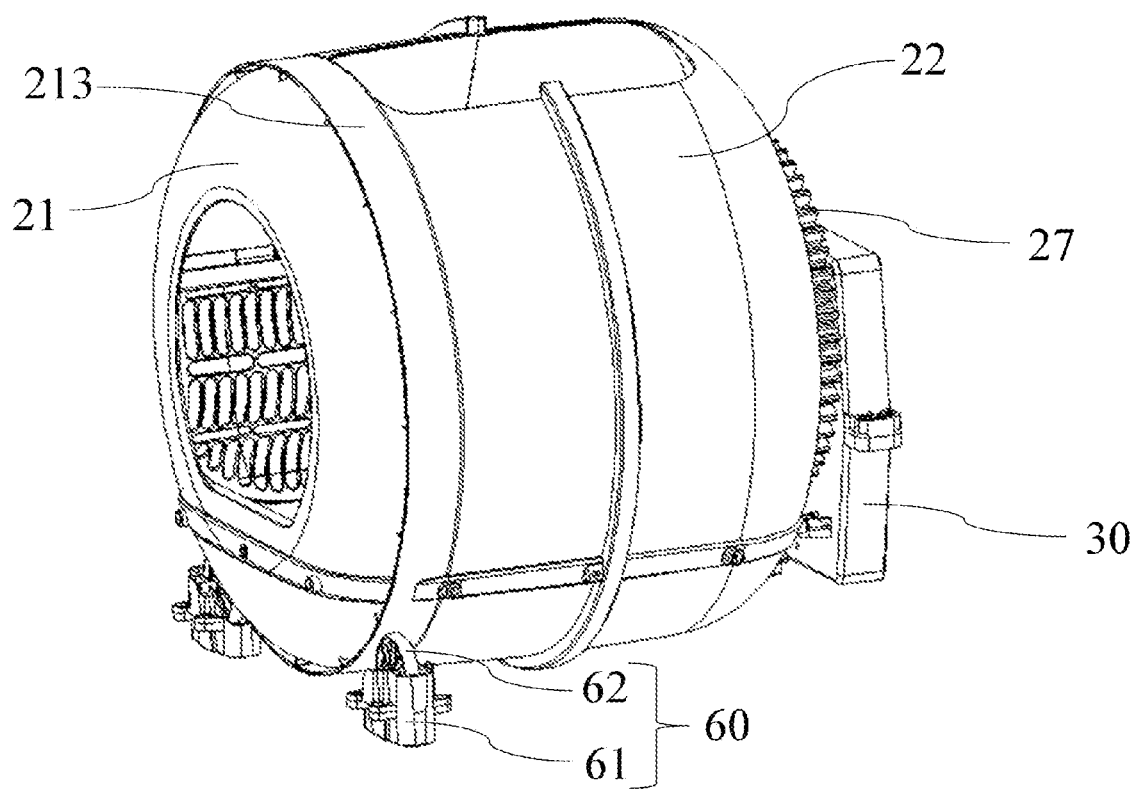
FIG. 11 is a schematic structural view showing relative positions of the rotary drum and support assemblies in FIG. 3.

As shown in FIG. 9, FIG. 10, and FIG. 11, in this embodiment, the rotary drum 20 includes a first drum portion 21 and a second drum portion 22 arranged in a front-rear direction. A first connection portion 211 annularly protruding from a cylinder surface of the first drum portion 21 is arranged at a rear end of the first drum portion 21. A second connection portion 221 annularly protruding from a cylinder surface of the second drum portion 22 is arranged at a front end of the second drum portion 22. The first connection portion 211 and the second connection portion 221 are connected by a bolt, so that the first drum portion 21 and the second drum portion 22 are fixedly connected, and a receiving cavity is formed between the first drum portion 21 and the second drum portion 22. A first notch 231 is further provided at the rear end of the first drum portion 21, a second notch 232 is further provided at the front end of the second drum portion 22, and the first notch 231 and the second notch 232 form a waste discharge port 23 of the rotary drum 20. After the pet defecates in the rotary drum 20, the excrement is mixed with cat litter to form clumps, and the clumps are discharged to the outside of the rotary drum 20 through the waste discharge port 23, thereby keeping the inside of the rotary drum 20 clean.

In this embodiment, to ensure the cleanliness of the inside of the rotary drum 20 and prevent pet excrement from adhering to an inner wall surface of the rotary drum 20, an anti-adhesion layer 25 is arranged on an inner bottom surface of the rotary drum 20 which is defined in a stationary state of the rotary drum 20. Specifically, as shown in FIG. 10, in this embodiment, an anti-adhesion layer bracket 24 is arranged on the inner bottom surface of the rotary drum 20, and the anti-adhesion layer 25 is detachably connected to the anti-adhesion layer bracket 24, so that the anti-adhesion layer 25 can be removed and replaced with a new one as required. In this embodiment, the anti-adhesion layer 25 is an anti-adhesion pad made of a polythiourethane (PTU), which may be connected to the anti-adhesion layer bracket 24 by engaging or bonding. The arrangement of the anti-adhesion layer 25 inside the rotary drum 20 can effectively prevent pet excrement from adhering to an inner wall of the rotary drum 20, and facilitate the cleaning of the inner wall of the rotary drum 20, to ensure the cleanliness of the cat litter box and reduce the generation of unpleasant smell and bacteria, thereby providing a sound environment for the growth and health of cats. In some other embodiments of the present disclosure, the anti-adhesion layer 25 may also be a Teflon anti-adhesion coating or an anti-adhesion coating made of other materials arranged on the inner wall surface of the rotary drum 20.

As shown in FIG. 8 and FIG. 10, in this embodiment, a rotary drum entrance 212 is provided at a front end of the first drum portion 21, and the pet may enter the receiving cavity inside the rotary drum 20 through the rotary drum entrance 212. A first through hole 222 is further provided at a rear end of the second drum portion 22. The first through hole 222, the second through hole 261, and the rotary drum entrance 212 are respectively coaxial with the rotary drum 20, so that the situation inside the rotary drum 20 and the entry and exit of pets into and out of the receiving cavity of the rotary drum 20 can be observed through the second through hole 261, and the operational status of the rotary drum 20 can be controlled accordingly. Further, as shown in FIG. 3 and FIG. 11, the cat litter box 1 in this embodiment further includes two support assemblies 60. The two support assemblies 60 are arranged between the middle shell 12 and the rotary drum 20 and configured to jointly support a rotation of the rotary drum 20. Each of the two support assemblies 60 includes a support base 61 and a roller 62 rotatably connected to the support base 61. The support base 61 is connected to an inner wall surface of the middle shell 12, and the roller 62 is rotatably in contact with an outer wall surface of the rotary drum 20.

In this embodiment, to ensure that the roller 62 on each of the support assemblies 60 can stably support a front end of the rotary drum 20, an annular support 213 is arranged on an outer peripheral surface of a front end of the first drum portion 21. The annular support 213 is a flat annular surface, which provides a closer fit with the roller 62 to ensure that the rotation of the front end of the rotary drum 20 is supported by the roller 62. In addition, in this embodiment, the rear end of the rotary drum 20 is supported through the cooperation of the rotary drum shaft 26 with the bearing housing 319 of the integral bracket 31. Because the annular support 213 and the rotary drum shaft 26 are respectively arranged at the front end and rear end of the rotary drum 20 and are respectively supported by the support assemblies 60 and the integral bracket 31, the length by which the front end and rear end of the rotary drum 20 are supported is effectively increased, thereby making the center of gravity of the rotary drum 20 more stable, ensuring that the rotary drum 20 does not move axially during rotation, and reducing noise generated during rotation of the rotary drum 20. Further, in this embodiment, chamfers between end surfaces of the front end and rear end of the rotary drum 20 and an axial inner wall surface of the rotary drum 20 are further reduced, and the volume of the rotary drum 20 is increased accordingly, thereby increasing the space for the pet to move in the rotary drum 20.

As shown in FIG. 12 to FIG. 16, in this embodiment, a sieve plate 70 is arranged in the receiving cavity inside the rotary drum 20. The sieve plate 70 is configured to separate cat litter clumps formed due to contamination by excrement from clean cat litter, and discharge the cat litter clumps to the outside of the rotary drum 20 through the waste discharge port 23, with the clean cat litter being still retained in the rotary drum 20 for use. In this embodiment, the sieve plate 70 includes a plate body 71 and a connection end 72. In this embodiment, the plate body 71 includes a first arc-shaped surface S1, a second arc-shaped surface S2, and a third arc-shaped surface S3. The first arc-shaped surface S1, the second arc-shaped surface S2, and the third arc-shaped surface S3 are arranged in sequence in an extending direction of the plate body 71. The first arc-shaped surface S1 and the second arc-shaped surface S2 respectively protrude in different directions to jointly form an S-shaped structure. The second arc-shaped surface S2 and the third arc-shaped surface S3 respectively protrude in different directions to jointly form an S-shaped structure. In this way, the first arc-shaped surface S1, the second arc-shaped surface S2, and the third arc-shaped surface S3 form a wave-shaped structure as a whole in a side direction. A central angle corresponding to the second arc-shaped surface S2 is less than a central angle corresponding to the first arc-shaped surface S1 and a central angle corresponding to the third arc-shaped surface S3, and an arc radius corresponding to the second arc-shaped surface S2 is greater than an arc radius corresponding to the first arc-shaped surface S1 and an arc radius corresponding to the third arc-shaped surface S3, to facilitate the sliding of cat litter onto the first arc-shaped surface S1 and the third arc-shaped surface S3 through the second arc-shaped surface S2 and the subsequent sieving of the cat litter. The arrangement of the wave-shaped structure can effectively increase the sieving area of the plate body 71, so that the contact area between the cat litter and the sieve plate 70 during the movement of the cat litter relative to the sieve plate 70 can be increased, thereby effectively separating the cat litter clumps from the remaining clean cat litter. In some other embodiments of the present disclosure, one or two arc-shaped surfaces may be arranged. The cat litter is sieved through the one or two arc-shaped surfaces, or the one or two arc-shaped surfaces may be connected to a plane, so that the sieving area for the cat litter is increased through the cooperation of the plane and the arc-shaped surfaces, so as to sieve the cat litter. Alternatively, more arc-shaped surfaces may be arranged, and the cat litter is effectively sieved through the arc-shaped surfaces.

Further, in this embodiment, a circular arc transition is adopted between the end surfaces of the two ends of the rotary drum 20 and the inner wall surface of the rotary drum 20 in the axial direction, a width dimension of an end of the plate body 71 in the extending direction of the plate body 71 gradually decreases, so as to ensure that the sieve plate 70 is well fitted inside the rotary drum 20 and prevent interference between the sieve plate 70 and the inner wall surface of the rotary drum 20 during rotation of the rotary drum 20. A dimension of the plate body 71 in a length direction of the plate body 71 is defined as the dimension of the plate body 71 in the extending direction of the plate body 71, and a dimension of the plate body 71 in a width direction of the plate body 71 is defined as a dimension of the plate body 71 in a direction perpendicular to the extending direction of the plate body 71. Specifically, in this embodiment, a width dimension of the third arc-shaped surface S3 gradually decreases in an extending direction of the third arc-shaped surface S3, to facilitate the mounting of the sieve plate 70 into the rotary drum 20 and effectively prevent the sieve plate 70 from interfering with the inner wall surface of the rotary drum 20.

Figure 13:
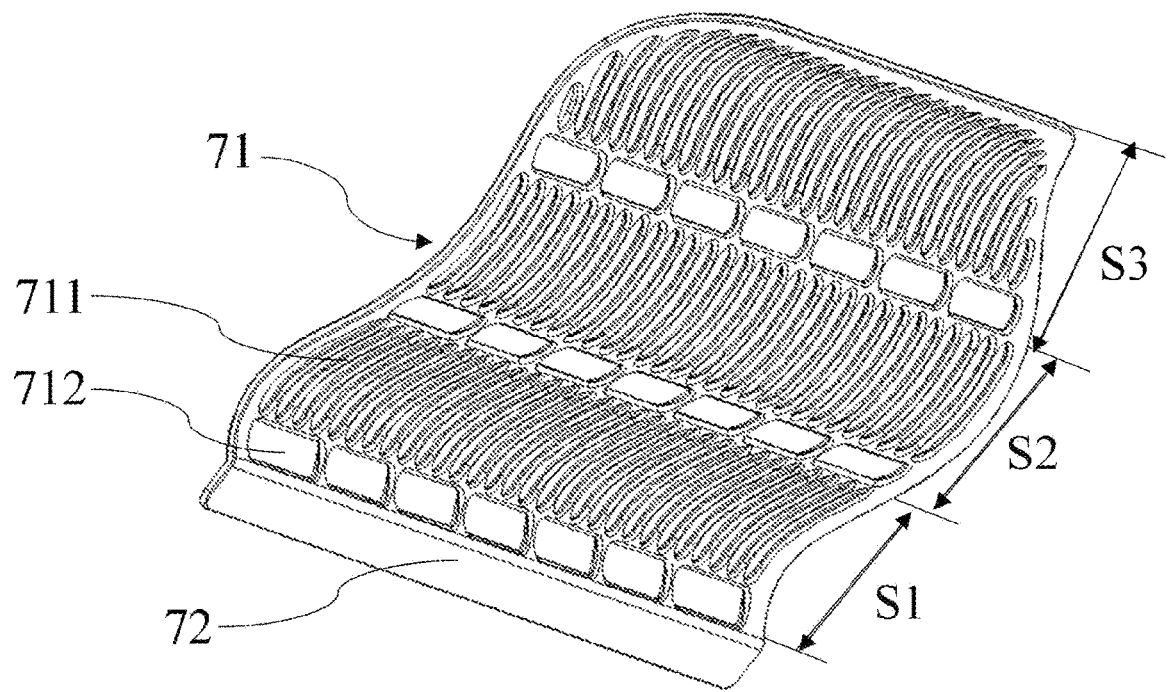
FIG. 13 is an axonometric view of a sieve plate in FIG. 12.
Figure 14:
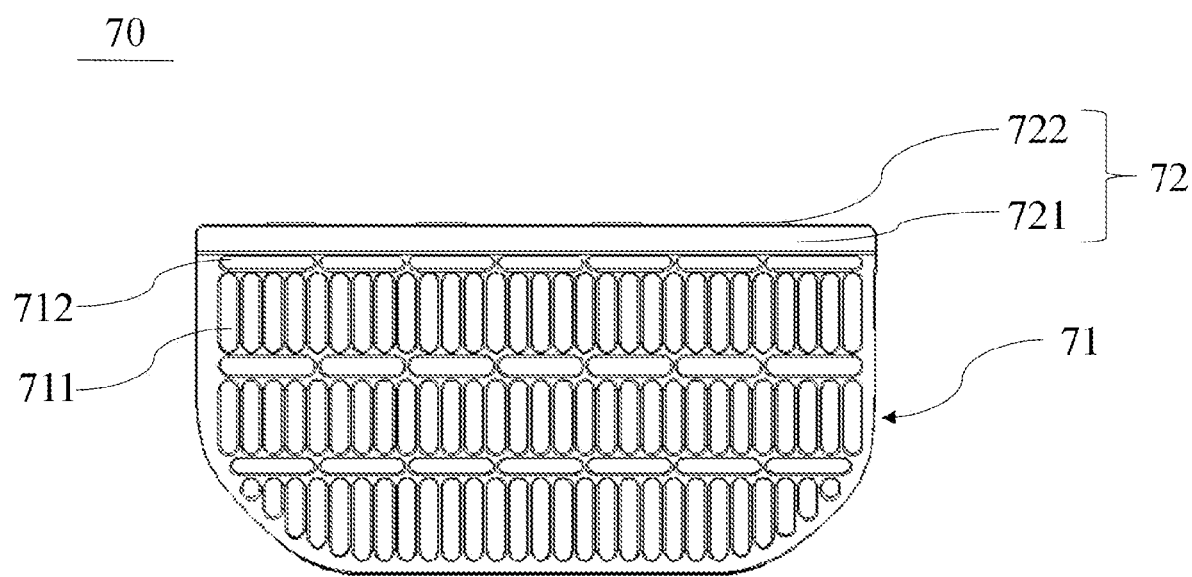
FIG. 14 is a front view of the sieve plate in FIG. 12.
Figure 15:
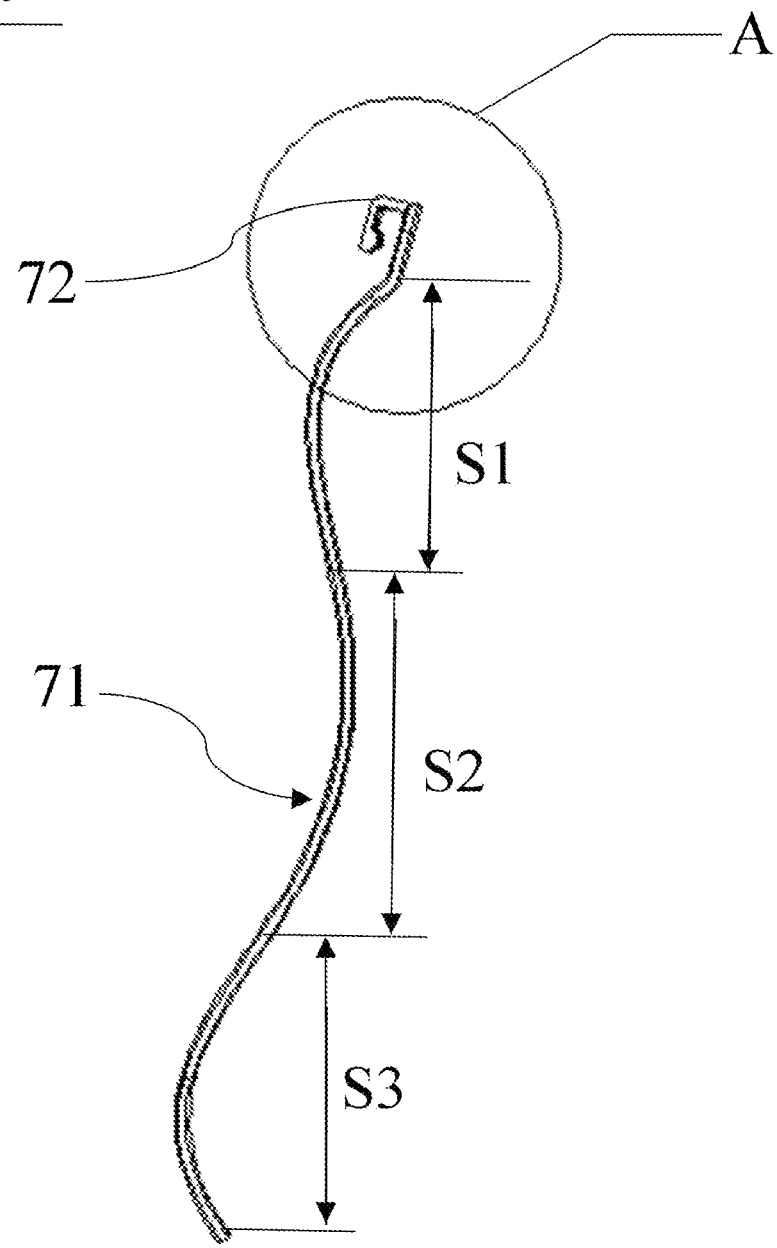
FIG. 15 is a side view of the sieve plate in FIG. 12.

As shown in FIG. 13 to FIG. 15, in this embodiment, a plurality of first sieve holes 711 and a plurality of second sieve holes 712 are provided on each of the first arc-shaped surface S1, the second arc-shaped surface S2, and the third arc-shaped surface S3, and a length direction of each of the plurality of first sieve holes 711 and a length direction of each of the plurality of second sieve holes 712 are configured to form an angle. For convenience of description, only the plurality of first sieve holes 711 and the plurality of second sieve holes 712 on the first arc-shaped surface S1 are taken as an example for description in this embodiment. Specifically, in this embodiment, the first sieve holes 711 and the second sieve holes 712 are all elongated holes, to be specific, runway-shaped holes, i.e., rectangular holes with circular arc transitions at four corners thereof. The length direction of each of the first sieve holes 711 and the length direction of each of the second sieve holes 712 are configured to form an angle of 90°. When the cat litter moves on the sieve plate 70 along the extending direction of the sieve plate 70, the configuration of the length direction of each of the first sieve holes 711 and the length direction of each of the second sieve holes 712 to form an angle allows for repeated filtering of the cat litter at multiple angles, so that cat litter clumps are retained on the plate body 71, and the remaining clean cat litter falls through the first sieve holes 711 and the second sieve holes 712. In this way, the cat litter clumps can be effectively separated from the clean cat litter, thereby reducing the waste of cat litter. In some other embodiments of the present disclosure, the length direction of each of the first sieve holes 711 and the length direction of each of the second sieve holes 712 may be configured to form any angle, which is not limited herein.

Further, in this embodiment, the plurality of first sieve holes 711 and the plurality of second sieve holes 712 are all arranged in a direction perpendicular to the extending direction of the plate body 71, and the first sieve holes 711 and the second sieve holes 712 are arranged alternately in the extending direction of the plate body 71. The arrangement of the plurality of first sieve holes 711 and the plurality of second sieve holes 712 can effectively utilize the surface area of the plate body 71 to increase the ratio of hole area on the plate body 71, thereby improving the effect of cat litter sieving. In this embodiment, the length direction of each of the first sieve holes 711 is consistent with the extending direction of the plate body 71, i.e., the first sieve holes 711 are provided in the extending direction of the arc-shaped surface; and the length direction of each of the second sieve holes 712 is perpendicular to the length direction of each of the first sieve holes 711, i.e., the second sieve holes 712 are provided in a direction perpendicular to the extending direction of the arc-shaped surface. In this embodiment, the length dimension of each of the first sieve holes 711 is greater than the length dimension of each of the second sieve holes 712, and the width dimension of each of the first sieve holes 711 is less than the width dimension of each of the second sieve holes 712, so that most of cat litter currently available on the market can be sieved with the combination of the first sieve holes 711 and the second sieve holes 712, thereby effectively ensuring the effect of cat litter sieving and reducing the waste of cat litter.

Figure 12:
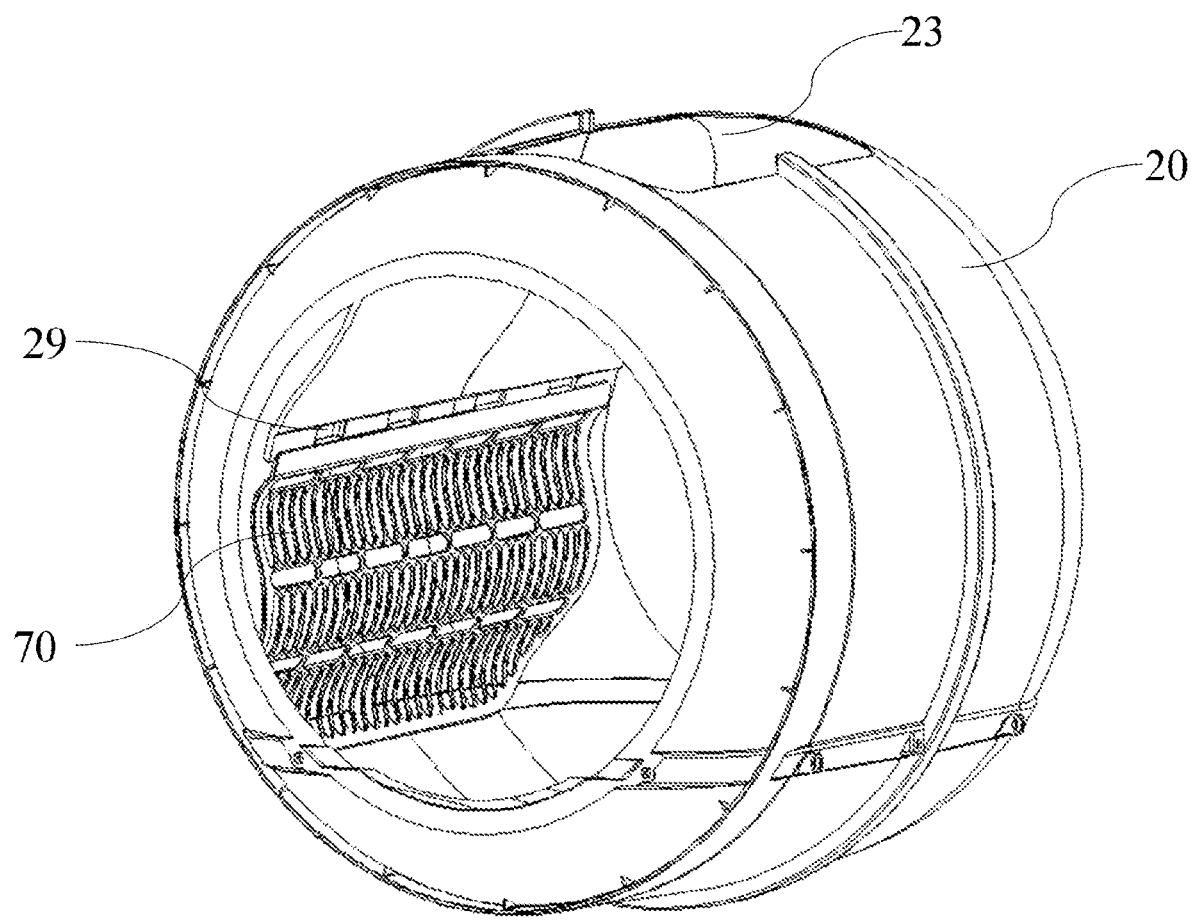
FIG. 12 is a schematic structural view of the rotary drum in FIG. 2.
Figure 16:
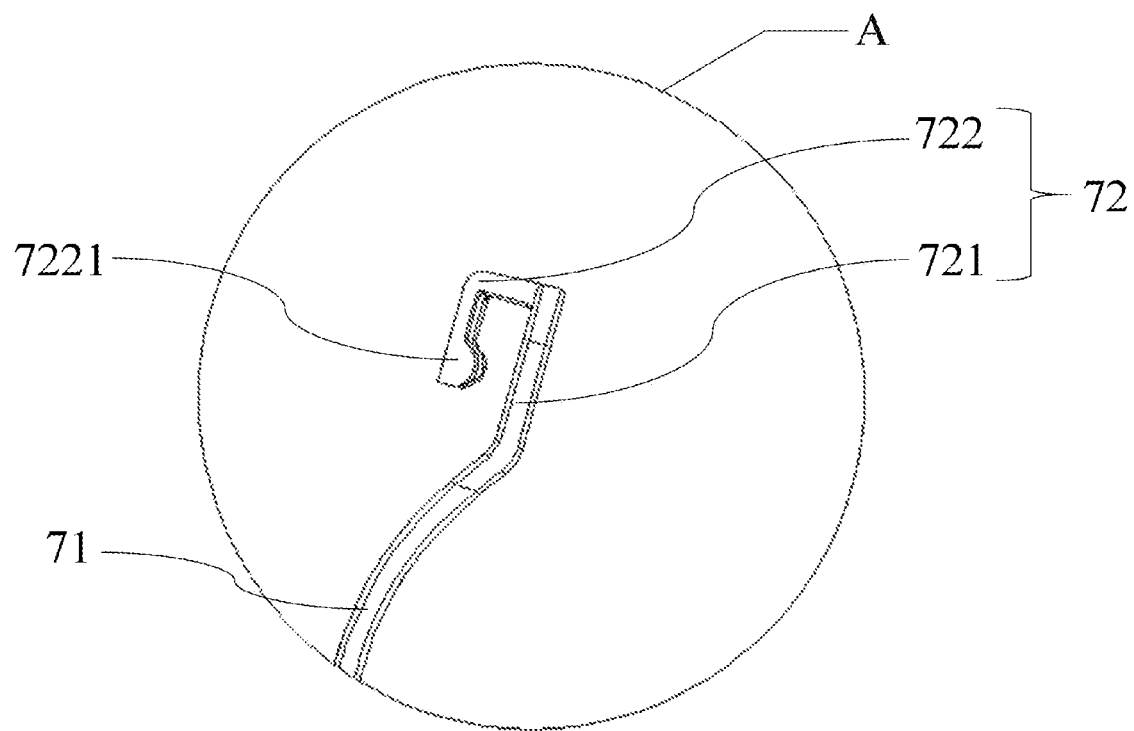
FIG. 16 is a schematic enlarged structural view of part A in FIG. 15.
Figure 17:
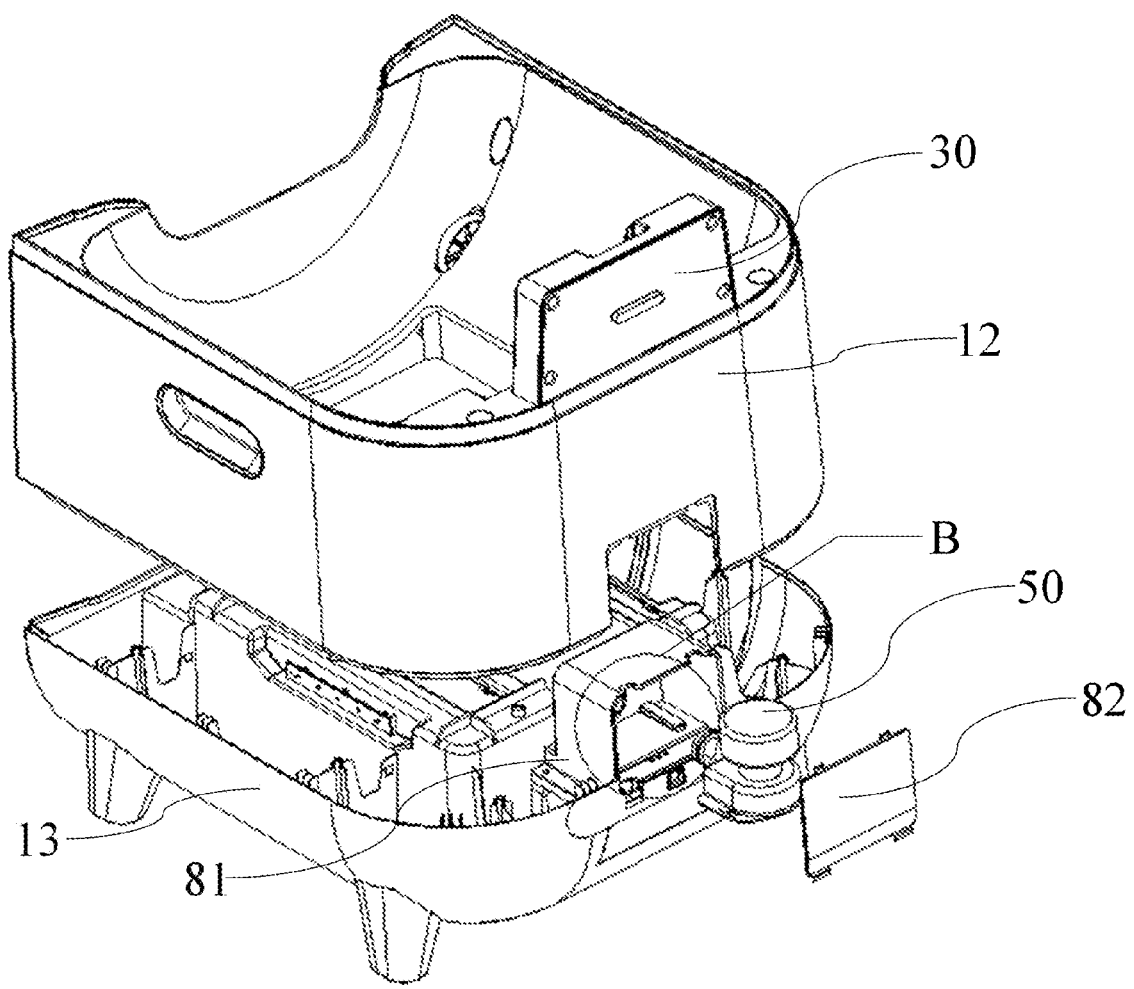
FIG. 17 is a schematic structural view showing relative positions of a deodorizing assembly and a shell assembly in FIG. 3.

As shown in FIG. 12, FIG. 15, and FIG. 16, in this embodiment, the sieve plate 70 further includes a connection end 72. The connection end 72 includes a connection plate 721 and a plurality of L-shaped members 722 connected to the connection plate 721. The plurality of L-shaped members 722 are arranged at intervals in a length direction of the connection plate 721. The length direction of the connection plate 721 is perpendicular to the extending direction of the plate body 71. A first side end portion of the connection plate 721 is connected to a starting end of the plate body 71 in the extending direction of the plate body 71, and a second side end portion of the connection plate 721 is connected to the plurality of L-shaped members 722. The connection end 72 and the plate body 71 may form an integral structure or may be detachable from each other. Correspondingly, in this embodiment, mounting grooves 29 for being respectively inserted into and fitted with the L-shaped members 722 are provided on the inner wall of the rotary drum 20. In this embodiment, a plurality of mounting grooves 29 are provided at intervals on the inner wall of the rotary drum 20, and the L-shaped members 722 are respectively rotatably inserted into the mounting grooves 29, so that the sieve plate 70 can rotate in the receiving cavity of the rotary drum 20 to cause the cat litter clumps to move along the first arc-shaped surface S1, the second arc-shaped surface S2, and the third arc-shaped surface S3 on the plate body. In this way, the sieving area of the plate body 71 for the cat litter is increased, the clean cat litter falls to the bottom of the rotary drum 20 through the first sieve holes 711 and the second sieve holes 712, and the cat litter clumps are retained on the plate body 71 and finally discharged to the outside of the rotary drum 20 through the waste discharge port 23 along with the rotation of the rotary drum 20, thereby effectively achieving cat litter separation. Further, as shown in FIG. 16, in this embodiment, an arc-shaped protrusion 7221 is arranged at an end of each L-shaped member 722 distant from the connection plate 721, and the arc-shaped protrusion 7221 is arranged to face the connection plate 721, so as to fit with an inner wall surface of the mounting groove 29 during rotation of the L-shaped member 722. The fitting of the arc-shaped protrusion 7221 with the inner wall surface of the mounting groove 29 increases the smoothness of rotation of the sieve plate 70, thereby effectively ensuring the effect of cat litter separation.

In the cat litter box 1 according to the present disclosure, the rotatable sieve plate 70 is arranged inside the rotary drum 20 of the cat litter box 1, the plate body 71 of the sieve plate 70 is configured to include a plurality of arc-shaped surfaces, and a plurality of first sieve holes 711 and a plurality of second sieve holes 712 are provided on the arc-shaped surfaces. In this way, the sieving area of the plate body 71 can be effectively increased, so that the contact area between the cat litter and the sieve plate 70 during the movement of the cat litter relative to the sieve plate 70 can be increased. In addition, the configuration of the length direction of each of the first sieve holes 711 and the length direction of each of the second sieve holes 712 to form an angle allows for repeated filtering of the cat litter at multiple angles, so that cat litter clumps are retained on the plate body 71, and the remaining clean cat litter falls to the bottom of the rotary drum 20 through the first sieve holes 711 and the second sieve holes 712. In this way, the cat litter clumps can be effectively separated from the clean cat litter, thereby reducing the waste of cat litter.

Further, as shown in FIG. 17 to FIG. 20, the cat litter box 1 in this embodiment further includes a deodorizing assembly 50, the deodorizing assembly 50 is detachably connected to the bottom shell and is in communication with an internal cavity of the bottom shell 13. Specifically, in this embodiment, a mounting box is arranged at a rear end of the bottom shell 13. The mounting box includes a box body 81 and a box cover 82. A mounting space is provided inside the box body 81, and the deodorizing assembly 50 is arranged in the mounting space. A communication hole is provided on a front end surface of the box body 81, and the deodorizing assembly 50 is in communication with the internal cavity of the bottom shell 13 through the communication hole, to remove odor inside the bottom shell 13. A rectangular opening is further provided at a rear end of the box body 81, and the box cover 82 is detachably connected at the rectangular opening. In this embodiment, a first slot 814 and a second slot 815 are respectively provided at an upper end and a lower end of an end surface of the box body 81 facing the box cover 82, and a first insertion portion 821 and a second insertion portion 822 are respectively arranged at an upper end and a lower end of an end surface of the box cover 82 facing the box body 81. The first insertion portion 821 is inserted in the first slot 814 and the second insertion portion 822 is inserted in the second slot 815. Through the insertion and fitting, the box cover 82 is connected to the rear end of the box body 81 in a readily detachable manner. To replace or repair the deodorizing assembly 50, the user only needs to disconnect the box cover 82 from the box body 81 to expose the deodorizing assembly 50 to a rear end of the cat litter box 1, and then remove the deodorizing assembly 50.

Figure 18:
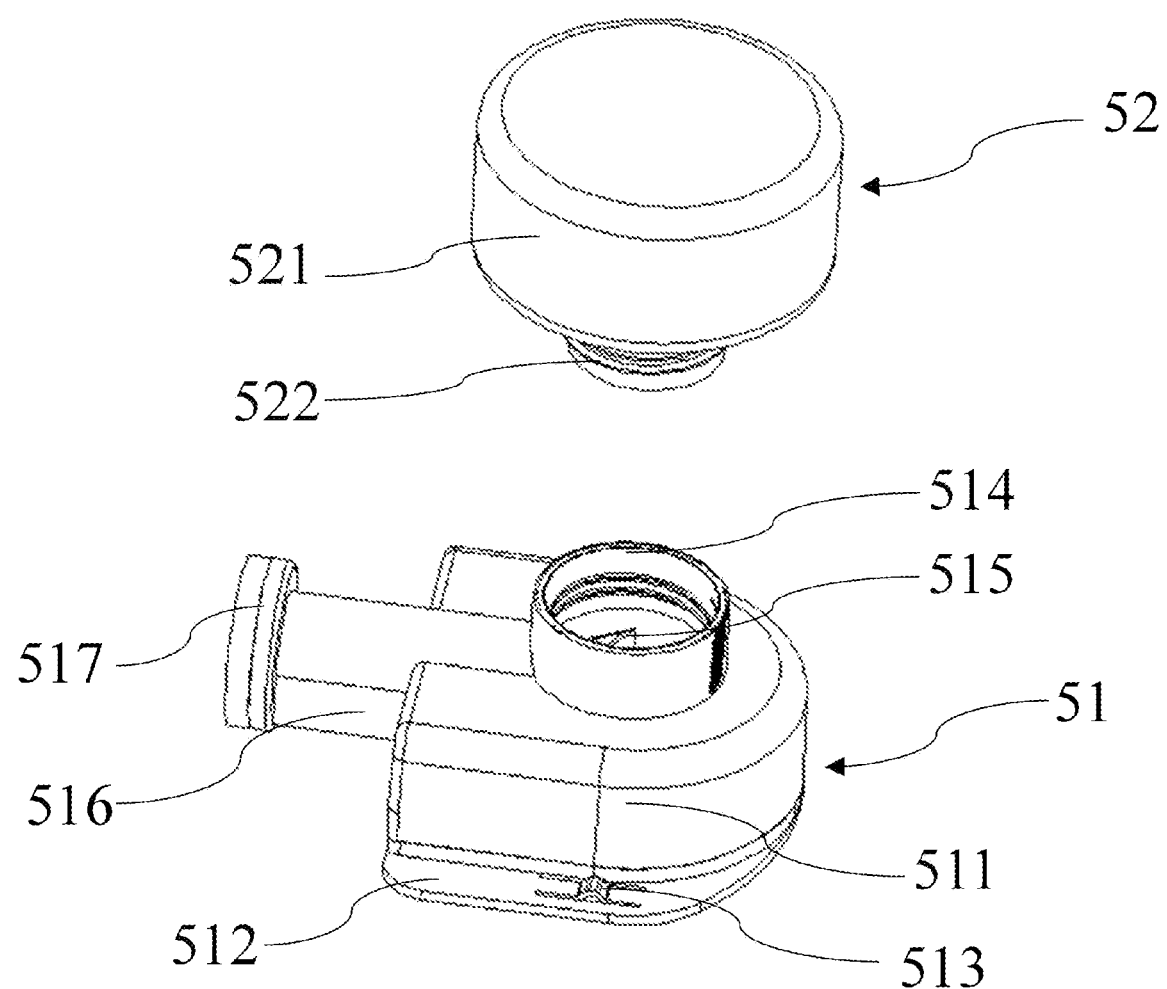
FIG. 18 is a schematic exploded structural view of the deodorizing assembly in FIG. 17.
Figure 19:
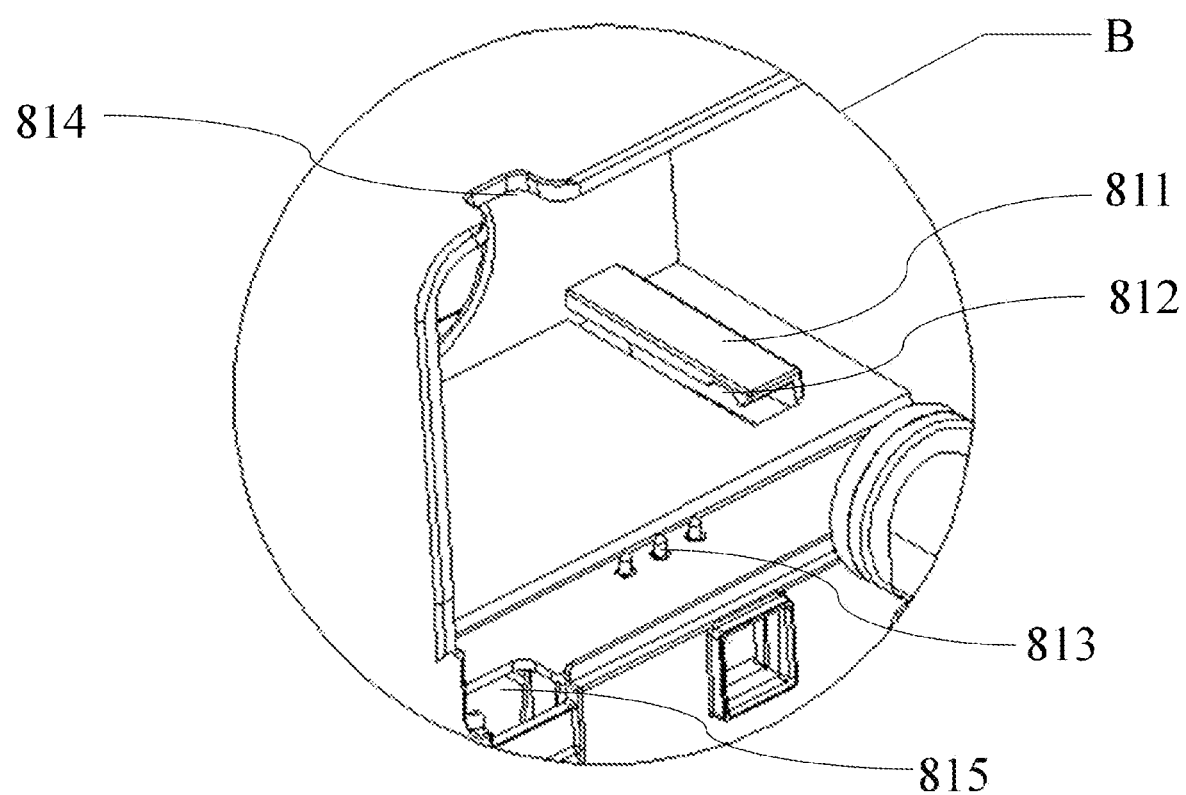
FIG. 19 is a schematic enlarged structural view of part B in FIG. 17.
Figure 20:
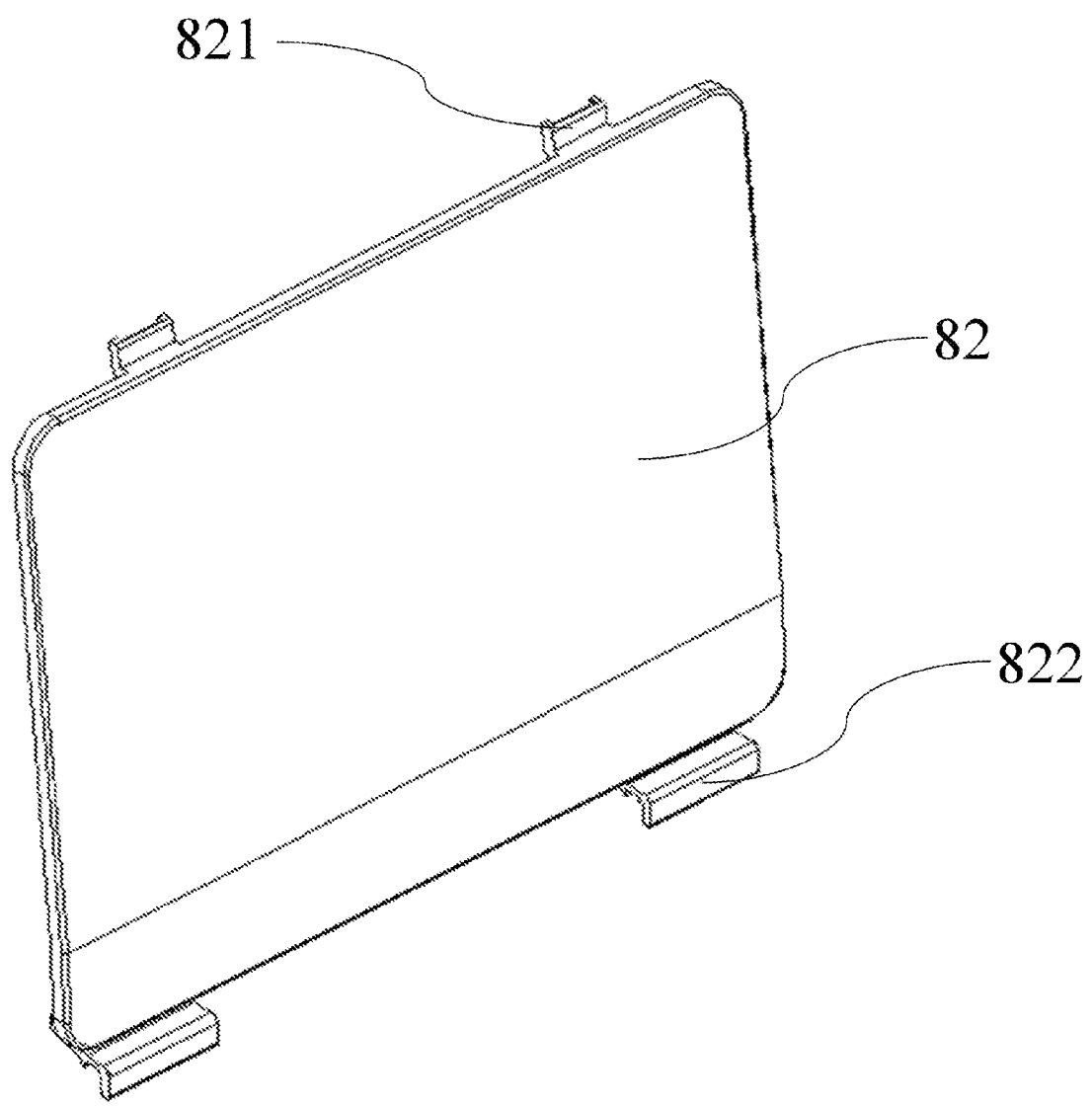
FIG. 20 is a schematic structural view of a box cover in FIG. 17.

As shown in FIG. 18, in this embodiment, the deodorizing assembly 50 includes a spray generator 51 and a deodorizing liquid box 52, and the deodorizing liquid box 52 is detachably connected to the spray generator 51. Specifically, in this embodiment, the spray generator 51 includes a first box body 511 and a bottom plate 512. The first box body 511 and the bottom plate 512 may form an integral structure or may be detachable from each other. A projection area of the first box body 511 on the bottom plate 512 is smaller than a cross-sectional area of the bottom plate 512, two sides of the bottom plate 512 respectively extend beyond two sides of the first box body 511, and an elastic protrusion 513 is arranged on the part of each of the two sides of the bottom plate 512 that extends beyond the respective side of the first box body 511. Correspondingly, as shown in FIG. 19, in this embodiment, an L-shaped protrusion 811 is arranged at a bottom of an inner cavity of the box body 81, the mounting groove is formed between the L-shaped protrusion 811 and a bottom surface of the inner cavity of the box body 81, and an engaging groove 812 is further provided on a surface of the L-shaped protrusion 811 facing the bottom surface of the box body. When the deodorizing assembly 50 is fitted with the mounting box, the two sides of the bottom plate 512 that extend beyond the first box body 511 are respectively inserted into the mounting groove formed between the L-shaped protrusion 811 inside the mounting box and the bottom surface of the inner cavity of the box body 81, and the elastic protrusion 513 is engaged into the engaging groove 812, thereby realizing the positioning and mounting of the deodorizing assembly 50 in the mounting box.

Further, in this embodiment, a receiving space having an opening at an end thereof is provided in the first box body 511 of the spray generator 51. The opening of the receiving space extends outward to form a first connection end 514, and an inner wall surface of the first connection end 514 is provided with internal threads. In this embodiment, the deodorizing liquid box 52 includes a second box body 521. A receiving space having an opening at an end thereof is also provided in the second box body 521. The opening of the second box body 521 extends outward to form a second connection end 522, and an outer wall surface of the second connection end 522 is provided with external threads. In this embodiment, during assembly of the spray generator 51 and the deodorizing liquid box 52, the second connection end 52 is inserted into the first connection end 514, and the detachable connection between the spray generator 51 and the deodorizing liquid box 52 is realized through engagement of the internal threads and the external threads.

Further, in this embodiment, the deodorizing liquid box 52 is filled with a deodorizing liquid for odor removal. To prevent the deodorizing liquid from flowing out before the deodorizing liquid box is connected to the spray generator 51, a sealing structure is arranged at the opening of the second connection end 522. The sealing structure is, for example, a plastic film or other tearable film having a blocking effect, or other movable or deformable blocking structures. Correspondingly, an insertion portion 515 facing the deodorizing liquid box 52 is arranged in the receiving space of the first box body 511, and the insertion portion 515 is arranged opposite to the first connection end 514, so that when the second connection end 522 is inserted into the first connection end 514, the insertion portion 515 can push away the sealing structure at the opening of the second connection end 522, so that the deodorizing liquid in the deodorizing liquid box 52 flows into the receiving space of the first box body 511, forms vapor under the action of the spray generator 51, and enters the internal cavity of the bottom shell 13 for removing odor in the bottom shell 13. Further, in this embodiment, a connection terminal 813 connected to a power supply is further arranged at an inner bottom surface of the box body 81, and a connection port (not shown) corresponding to the connection terminal 813 is arranged on the bottom plate of the spray generator 51. When the spray generator 51 is fixed inside the mounting box, the connection terminal 813 is inserted into the connection port to supply power to the spray generator 51, so that the spray generator 51 operates to vaporize the deodorizing liquid that enters the spray generator 51 and introduces the vapor into the internal cavity of the bottom shell 13. Further, in this embodiment, the spray generator 51 further includes a delivery pipe 516 in communication with the inside of the first box body 511, and a connection joint 517 is further arranged at an end of the delivery pipe 516 facing the box body 81. The connection joint 517 is arranged opposite to the communication hole on the front end surface of the box body 81, and the vaporized deodorizing liquid enters the inner cavity of the bottom shell 13 through the delivery pipe 516, the connection joint 517, and the communication hole in sequence.

Figure 21:
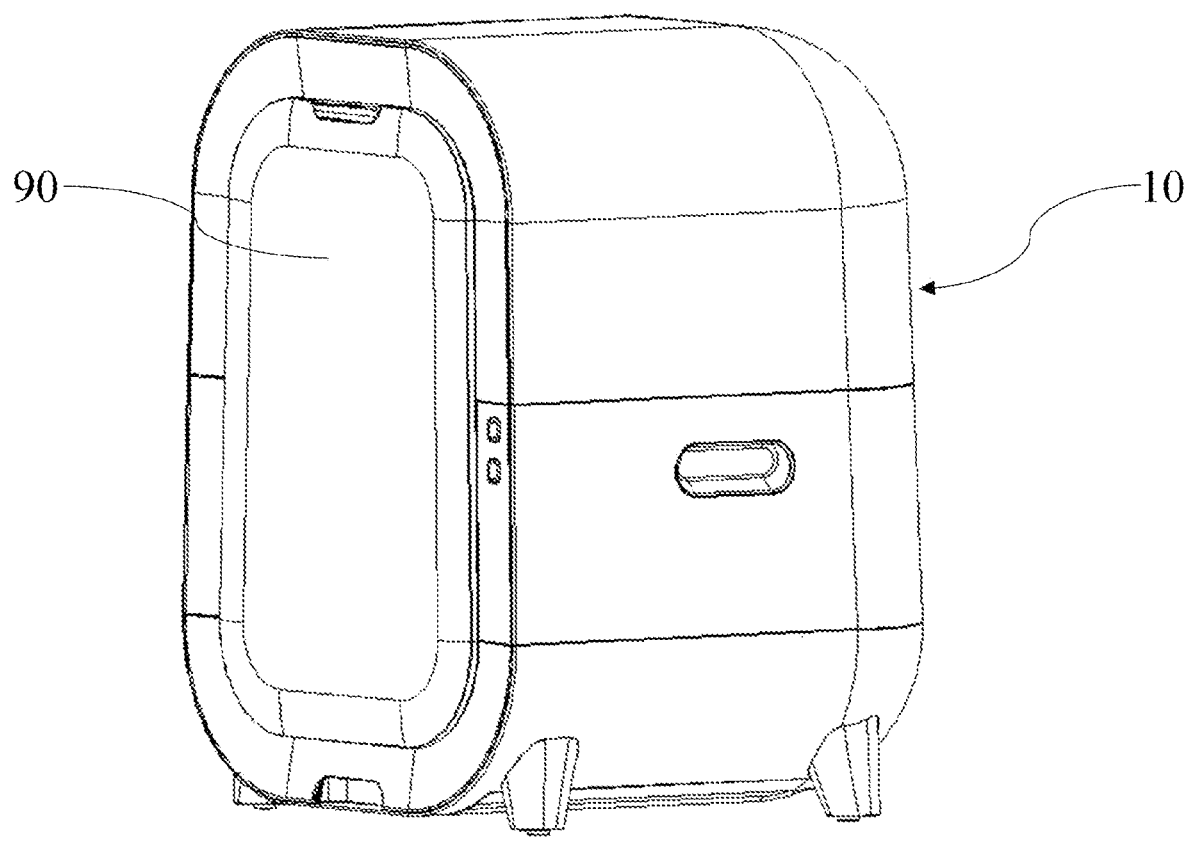
FIG. 21 is a schematic structural view of the cat litter box in FIG. 1 equipped with a door panel assembly.
Figure 22:
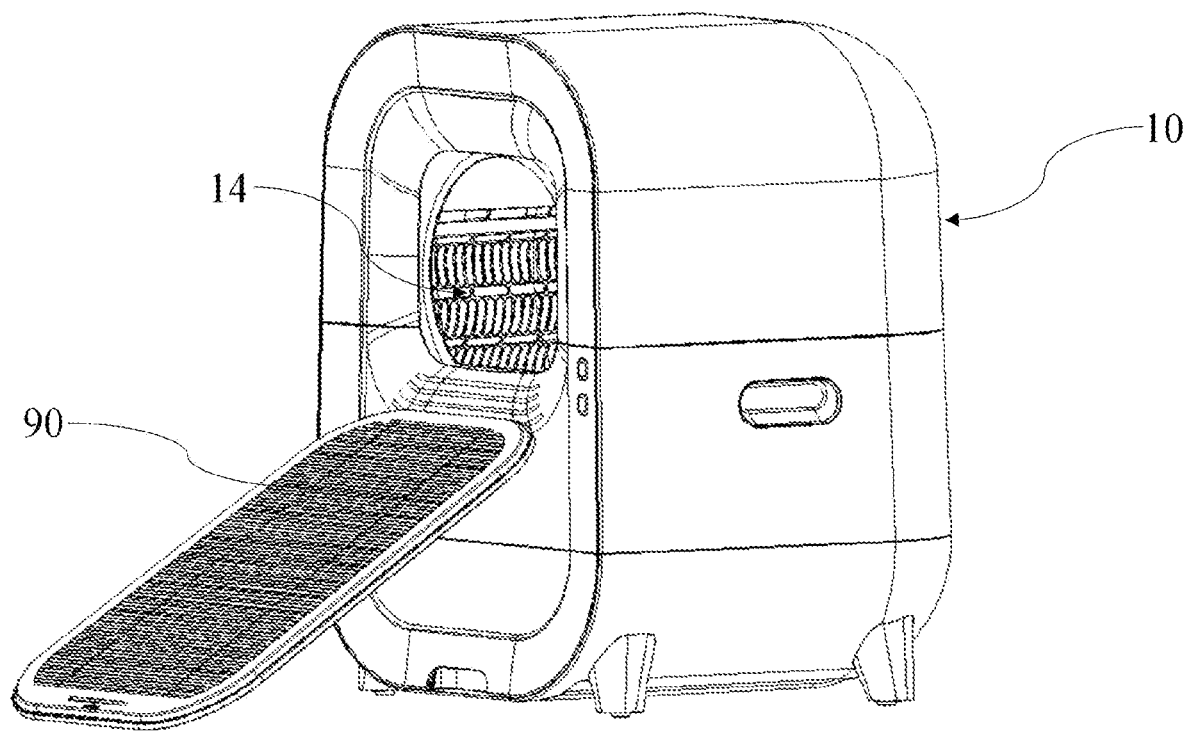
FIG. 22 is another schematic structural view showing the connection between the door panel assembly and the shell assembly in FIG. 21.
Figure 23:
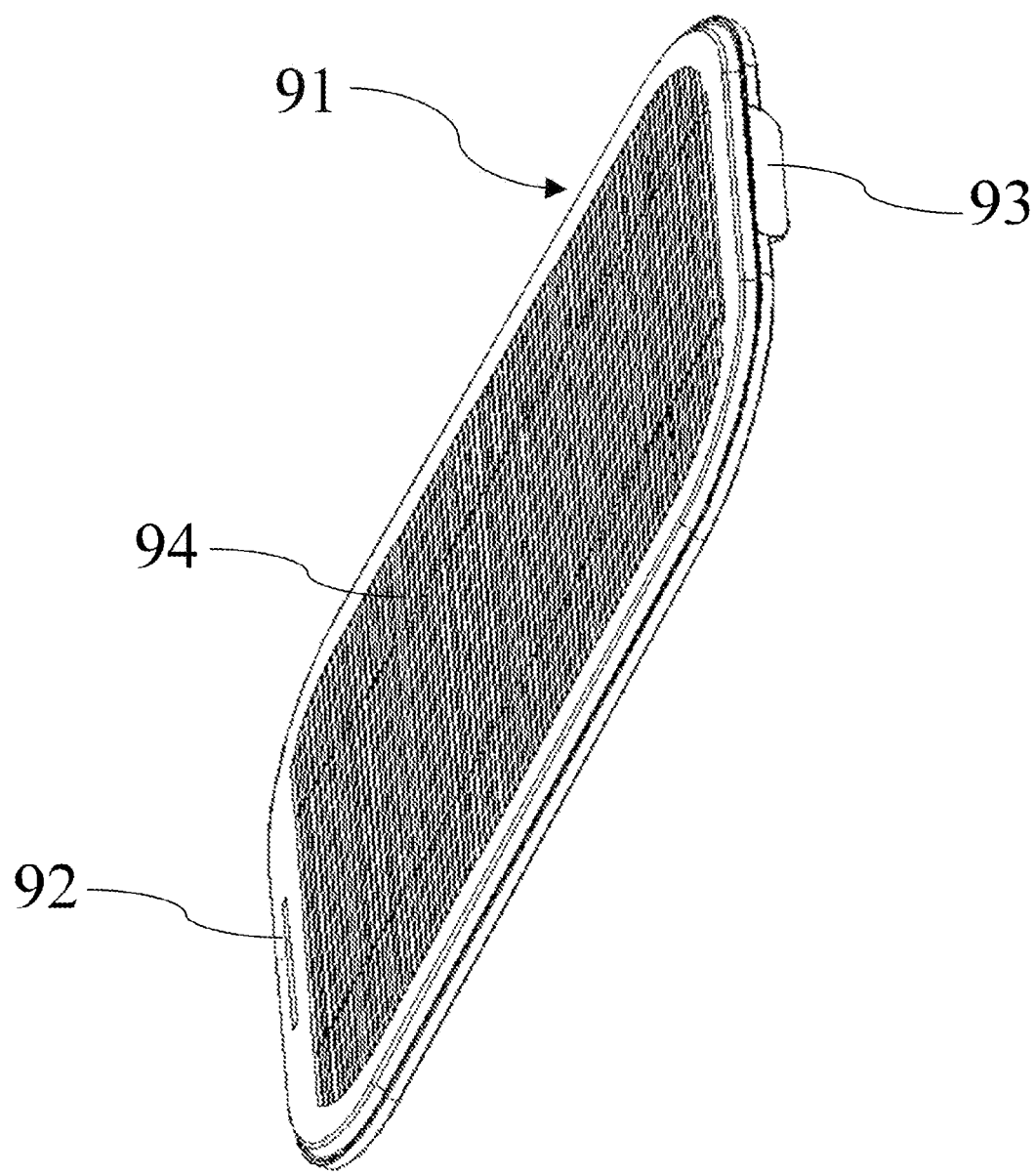
FIG. 23 is a schematic structural view of a door panel body in FIG. 22.

As shown in FIG. 21 to FIG. 23, the cat litter box 1 in this embodiment further includes a door panel assembly 90, detachably connected to a front end of the shell assembly 10. In this embodiment, the door panel assembly 90 includes a door panel body 91. A first magnetic member is arranged inside or on an inner side surface of the door panel body 91, and a second magnetic member opposite to the first magnetic member on the door panel body 91 is arranged on the shell assembly 10. The door panel body 91 is fixed to the front end of the shell assembly 10 by mutual attraction of the first magnetic member and the second magnetic member, to block the access opening 14. Specifically, at least one of the first magnetic member and the second magnetic member is a magnet, and the other is a magnet or a magnetically attractable metal material. Further, a handle 93 is arranged protruding from an outer side surface of the door panel body 91. When needing to use the cat litter box 1, the user may pull the door panel body 91 directly through the handle 93 on the outer side surface of the door panel body 91 to detach the door panel body 91 from the front end of the shell assembly 10 and release the magnetic connection between the shell assembly 10 and the door panel body 91. Specifically, in this embodiment, when the door panel body 91 is connected to the shell assembly 10, the door panel body 91 may be connected to the top shell 11, the middle shell 12, and the bottom shell 13 at the same time. Considering the large contact area between the door panel body 91 and the shell assembly 10, magnetic connections may be arranged at a plurality of positions, to ensure the connection strength between the door panel body 91 and the shell assembly 10 and prevent the door panel body 91 from falling off. Specifically, in this embodiment, the first magnetic member is arranged close to an outer edge of the door panel body 91 to facilitate magnetic attraction with the shell assembly 10.

As shown in FIG. 23, a protrusion structure is further arranged on an inner side surface of the door panel body 91 facing the rotary drum 20. The protrusion structure may be any one or more of a strip-shaped protrusion, a wave-shaped protrusion, or an annular protrusion. The protrusion structure in this embodiment is a strip-shaped protrusion 94. After the door panel body 91 is removed from the shell assembly 10, the door panel body 91 is placed with then inner side surface thereof facing upward, so that the door panel body 91 can be used as a scratch plate for pets to play with, thereby improving the versatility of the door panel body 91.

Figure 24:
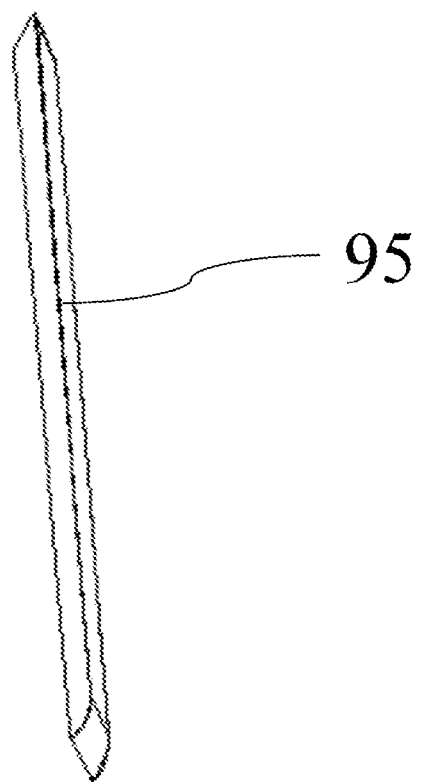
FIG. 24 is a schematic structural view of a rubber strip for use in combination with the door panel body in FIG. 23.

Further, as shown in FIG. 2, FIG. 22, and FIG. 23, in this embodiment, a positioning insertion opening 122 is further provided on the middle shell 12. After the door panel body 91 is removed from the shell assembly 10, the handle 93 on the outer side surface of the door panel body 91 may be inserted into the positioning insertion opening 122, and an end of the door panel body 91 opposite to the handle 93 may be pressed against a support surface, so that the door panel body 91 can be used as a ladder for pets to enter the rotary drum 20. As shown in FIG. 24, in this embodiment, the door panel assembly further includes a rubber strip 95. The rubber strip 95 may be inserted into the positioning insertion opening 122, so that after the door panel body 91 is removed from the shell assembly 10, the rubber strip 95 is inserted into the positioning insertion opening 122, to effectively prevent foreign objects from blocking the positioning insertion opening 122, and ensure that the handle 93 of the door panel body 91 can be continuously inserted into the positioning insertion opening 122 as a ladder for pets to enter the rotary drum 20. Further, in this embodiment, a fixing groove 92 is further provided on the inner side surface of the door panel body 91, and the rubber strip 95 can be inserted into the fixing groove 92 and positioned, thereby preventing the rubber strip 95 from being lost due to failure in fixing the rubber strip 95 in a state where the handle 93 of the door panel body 91 is inserted into the positioning insertion opening 122.

The foregoing descriptions are merely preferred specific embodiments of the present disclosure, but are not intended to limit the protection scope of the present disclosure. Any variation or replacement readily figured out by those skilled in the art within the technical scope disclosed in the present disclosure shall fall within the protection scope of the present disclosure. Therefore, the protection scope of the present disclosure is defined by the appended claims.

What is claimed is:

1. A cat litter box, comprising
a shell assembly, wherein the shell assembly comprises a top shell, a middle shell, and a bottom shell arranged in sequence in a vertical direction, wherein an excrement collection compartment is arranged inside the bottom shell, the excrement collection compartment is arranged opposite to the middle shell, the top shell is detachably connected to the middle shell, the middle shell is detachably connected to the bottom shell, and a mounting cavity is formed between the top shell and the middle shell;
a rotary drum, wherein the rotary drum is rotatably arranged in the mounting cavity; and
a driving assembly, wherein the driving assembly is detachably connected to the middle shell and comprises a driving unit, wherein the driving unit is drivingly connected to the rotary drum;
a sieve plate is further arranged inside the rotary drum, the sieve plate comprises a plate body, and the plate body comprises a first arc-shaped surface, a second arc-shaped surface, and a third arc-shaped surface, and the first arc-shaped surface, the second arc-shaped surface, and the third arc-shaped surface are arranged in sequence in an extending direction of the plate body;
the first arc-shaped surface, the second arc-shaped surface, and the third arc-shaped surface form a wave-shaped structure as a whole in a side direction, a central angle corresponding to the second arc-shaped surface is less than a central angle corresponding to the first arc-shaped surface and a central angle corresponding to the third arc-shaped surface, and an arc radius corresponding to the second arc-shaped surface is greater than an arc radius corresponding to the first arc-shaped surface and an arc radius corresponding to the third arc-shaped surface.

2. The cat litter box according to claim 1, wherein a first opening is provided at a bottom of the middle shell, a second opening opposite to the first opening is provided at a top of the bottom shell, the excrement collection compartment is removably inserted into a side surface of the bottom shell, and a third opening opposite to the second opening is provided at a top of the excrement collection compartment.

3. The cat litter box according to claim 1, further comprising a deodorizing assembly, wherein the deodorizing assembly is detachably connected to the bottom shell and is in communication with an internal cavity of the bottom shell.

4. The cat litter box according to claim 3, wherein the deodorizing assembly comprises a spray generator and a deodorizing liquid box, and the deodorizing liquid box is detachably connected to the spray generator.

5. The cat litter box according to claim 2, wherein the bottom shell comprises a shell portion and a cover plate portion, the second opening is provided at a top of the shell portion, a fourth opening is provided at a bottom of the shell portion, and the cover plate portion is configured to cover the fourth opening and is detachably connected to the shell portion.

6. The cat litter box according to claim 1, wherein a rotary drum shaft coaxial with the rotary drum is arranged at a rear end of the rotary drum, and an end of the rotary drum shaft is rotatably connected to the driving assembly.

7. The cat litter box according to claim 6, wherein the driving assembly further comprises
an integral bracket, wherein a first accommodating groove and a second accommodating groove each having an opening facing an outside of the cat litter box are provided on the integral bracket, the first accommodating groove is inserted into an interior of the top shell, and the second accommodating groove is inserted into an interior of the middle shell; and
an electric control board, wherein the electric control board is arranged in the first accommodating groove, wherein the driving unit is arranged inside the second accommodating groove and electrically connected to the electric control board.

8. The cat litter box according to claim 7, wherein the driving assembly further comprises a first gear, wherein the first gear is drivingly connected to an output shaft of the driving unit, a second gear coaxial with the rotary drum shaft is arranged at the rear end of the rotary drum, and the first gear is meshed with the second gear.

9. The cat litter box according to claim 1, further comprising at least two support assemblies, wherein the at least two support assemblies are arranged between the middle shell and the rotary drum, and are configured to jointly support a rotation of the rotary drum, and the at least two support assemblies each comprise a support base and a roller rotatably connected to the support base, wherein the support base is connected to an inner wall surface of the middle shell, and the roller is rotatably pressed against an outer wall surface of the rotary drum.

10. The cat litter box according to claim 9, wherein an annular support is arranged on an outer peripheral surface of a front end of the rotary drum, and the roller is pressed against the annular support.

11. The cat litter box according to claim 1, wherein the sieve plate is detachably connected to an inner wall of the rotary drum.

12. The cat litter box according to claim 11, wherein a plurality of first sieve holes and a plurality of second sieve holes are provided on each of the first arc-shaped surface, the second arc-shaped surface, and the third arc-shaped surface, and a length direction of each of the plurality of first sieve holes and a length direction of each of the plurality of second sieve holes are configured to form an angle.

13. The cat litter box according to claim 1, further comprising a door panel assembly, wherein the door panel assembly is detachably connected to a front end of the shell assembly.

* * * * *